United States Patent
Watanabe et al.

(10) Patent No.: US 9,219,845 B2
(45) Date of Patent: Dec. 22, 2015

(54) INFORMATION STORAGE SYSTEM AND INFORMATION STORAGE METHOD

(71) Applicants: Taichi Watanabe, Kanagawa (JP); Jun Kimura, Tokyo (JP)

(72) Inventors: Taichi Watanabe, Kanagawa (JP); Jun Kimura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/532,093

(22) Filed: Nov. 4, 2014

(65) Prior Publication Data

US 2015/0124281 A1    May 7, 2015

(30) Foreign Application Priority Data

Nov. 6, 2013 (JP) .................................. 2013-230547
Oct. 17, 2014 (JP) .................................. 2014-212729

(51) Int. Cl.
 *G06F 3/12* (2006.01)
 *H04N 1/44* (2006.01)
 *H04N 1/00* (2006.01)

(52) U.S. Cl.
 CPC ......... *H04N 1/4406* (2013.01); *H04N 1/00244* (2013.01); *H04N 1/00307* (2013.01); *H04N 1/00326* (2013.01); *H04N 1/00339* (2013.01); *H04N 1/00408* (2013.01); *H04N 2201/0094* (2013.01)

(58) Field of Classification Search
 CPC ............ H04N 1/00244; H04N 1/4406; H04N 2201/0039; H04N 2201/0096; G04G 9/0011; G06Q 50/22; G06Q 40/00; G06Q 10/1095; G06F 17/2264; G06F 17/30011; G06F 19/3418; G06F 19/3462; G06F 3/1204
 USPC ................ 358/1.13, 1.14, 1.15; 709/225, 246
 See application file for complete search history.

(56) References Cited

U.S. PATENT DOCUMENTS

| | | | |
|---|---|---|---|
| 7,957,022 B2* | 6/2011 | Anno | 358/1.15 |
| 8,693,027 B2* | 4/2014 | Yasuhara | 358/1.15 |
| 8,756,673 B2 | 6/2014 | Barrus et al. | |
| 8,782,407 B2* | 7/2014 | Kuno et al. | 713/168 |
| 8,806,218 B2* | 8/2014 | Hatakeda | 713/182 |
| 8,892,889 B2* | 11/2014 | Sekiya et al. | 713/170 |
| 8,893,305 B2* | 11/2014 | Sugimoto et al. | 726/30 |

(Continued)

FOREIGN PATENT DOCUMENTS

| | | |
|---|---|---|
| JP | 2003-256260 | 9/2003 |
| JP | 2008-257720 | 10/2008 |
| JP | 2014-178917 | 9/2014 |

*Primary Examiner* — Negussie Worku
(74) *Attorney, Agent, or Firm* — IPUSA, PLLC

(57) ABSTRACT

An information storage system including information processing devices; an information storage device connected to the information processing devices; an access information generating unit configured to generate, based on a request from a first information processing device, access information for accessing a storage area in the information storage device to which access is restricted from the information processing devices other than the first information processing device; a display unit configured to cause the first information processing device to display the access information; a sending unit configured to cause a second information processing device to acquire the access information displayed on the first information processing device and to send the access information to the information storage device; and an access unit configured to cause the information storage device to allow the second information processing device to access the storage area based on the access information that has been sent.

15 Claims, 18 Drawing Sheets

(56) References Cited

U.S. PATENT DOCUMENTS

| | | |
|---|---|---|
| 8,984,302 B2 * | 3/2015 | Isozaki et al. ............... 713/193 |
| 9,038,165 B2 * | 5/2015 | Shigemasa et al. ........... 726/17 |
| 9,083,701 B2 * | 7/2015 | Hwang et al. ..................... 1/1 |
| 2007/0127067 A1 * | 6/2007 | Watanabe et al. ........... 358/1.15 |
| 2008/0028448 A1 * | 1/2008 | Tsuchitoi ........................ 726/6 |
| 2008/0052754 A1 * | 2/2008 | Iga ................................ 726/1 |
| 2009/0284785 A1 * | 11/2009 | Bando ......................... 358/1.15 |
| 2010/0271650 A1 * | 10/2010 | Tomizawa et al. ........... 358/1.13 |
| 2014/0059704 A1 * | 2/2014 | Kamada et al. ................ 726/28 |
| 2014/0280456 A1 | 9/2014 | Watanabe |
| 2014/0282991 A1 | 9/2014 | Watanabe et al. |

* cited by examiner

{"oneTimeAccessKey":"aaaaaaaa-bbbb-cccc-dddd-eeeeeeeeeee","filePath":"/fileServer/user01/test.pdf","serverAddress":"12.34.56.789"}

FIG.12

```
{
oneTimeAccessKey:"XXX-XXX-XXA",
filePath:"/fileServer/user01/test.pdf"
deviceName:"devB of 02",
deviceType:"devB",
deviceID:"bbb"
}
```

INFORMATION STORAGE SYSTEM AND INFORMATION STORAGE METHOD

BACKGROUND OF THE INVENTION

1. Field of the Invention

The present invention relates to an information storage system and an information storage method.

2. Description of the Related Art

Conventionally, there is known a file server that can apply an access right to a file or a folder in advance, so that a plurality of users can share a file (see, for example, Patent Document 1).

However, in the above conventional technology, in order for a plurality of users to share a file, an access right needs to be applied to the file or folder in advance. Therefore, for example, when a need to share a file arises when the use has gone outside, an access right needs to be applied to the file or folder from outside, which is problematic in terms of security.

Patent Document 1: Japanese Laid-Open Patent Publication No. 2003-256260

SUMMARY OF THE INVENTION

The present invention provides an information storage system and an information storage method, in which one or more of the above-described disadvantages are eliminated.

According to an aspect of the present invention, there is provided an information storage system including two or more information processing devices including a first information processing device and a second information processing device; an information storage device connected to the two or more information processing devices; an access information generating unit configured to generate, based on a request from the first information processing device, access information for accessing a predetermined storage area in the information storage device to which access is restricted from the two or more information processing devices other than the first information processing device; a display unit configured to cause the first information processing device to display the access information; a sending unit configured to cause the second information processing device to acquire the access information displayed on the first information processing device and to send the access information that has been acquired to the information storage device; and an access unit configured to cause the information storage device to allow the second information processing device to access the predetermined storage area based on the access information sent from the second information processing device.

According to an aspect of the present invention, there is provided an information storage system including an information processing device; and at least one other information processing device connected to the information processing device; an access information generating unit configured to generate, based on a request from the information processing device, access information for accessing a predetermined storage area to which access is restricted from the at least one other information processing device; a display unit configured to cause the information processing device to display the access information; a sending unit configured to cause the at least one other information processing device to acquire the access information displayed on the information processing device and to send the access information that has been acquired; and an access unit configured to allow the at least one other information processing device to access the predetermined storage area based on the access information that has been sent.

According to an aspect of the present invention, there is provided an information storage method performed in an information storage system including two or more information processing devices including a first information processing device and a second information processing device, and an information storage device connected to the two or more information processing devices, the information storage method including generating, based on a request from the first information processing device, access information for accessing a predetermined storage area in the information storage device to which access is restricted from the two or more information processing devices other than the first information processing device; causing the first information processing device to display the access information; causing the second information processing device to acquire the access information displayed on the first information processing device and to send the access information that has been acquired; and allowing the second information processing device to access the predetermined storage area based on the access information sent from the second information processing device.

BRIEF DESCRIPTION OF THE DRAWINGS

Other objects, features and advantages of the present invention will become more apparent from the following detailed description when read in conjunction with the accompanying drawings, in which:

FIG. 12 illustrates an example of information included in a file acquisition request;

DETAILED DESCRIPTION OF THE PREFERRED EMBODIMENTS

A description is given, with reference to the accompanying drawings, of embodiments of the present invention.

First Embodiment

System Configuration

Figure 1:
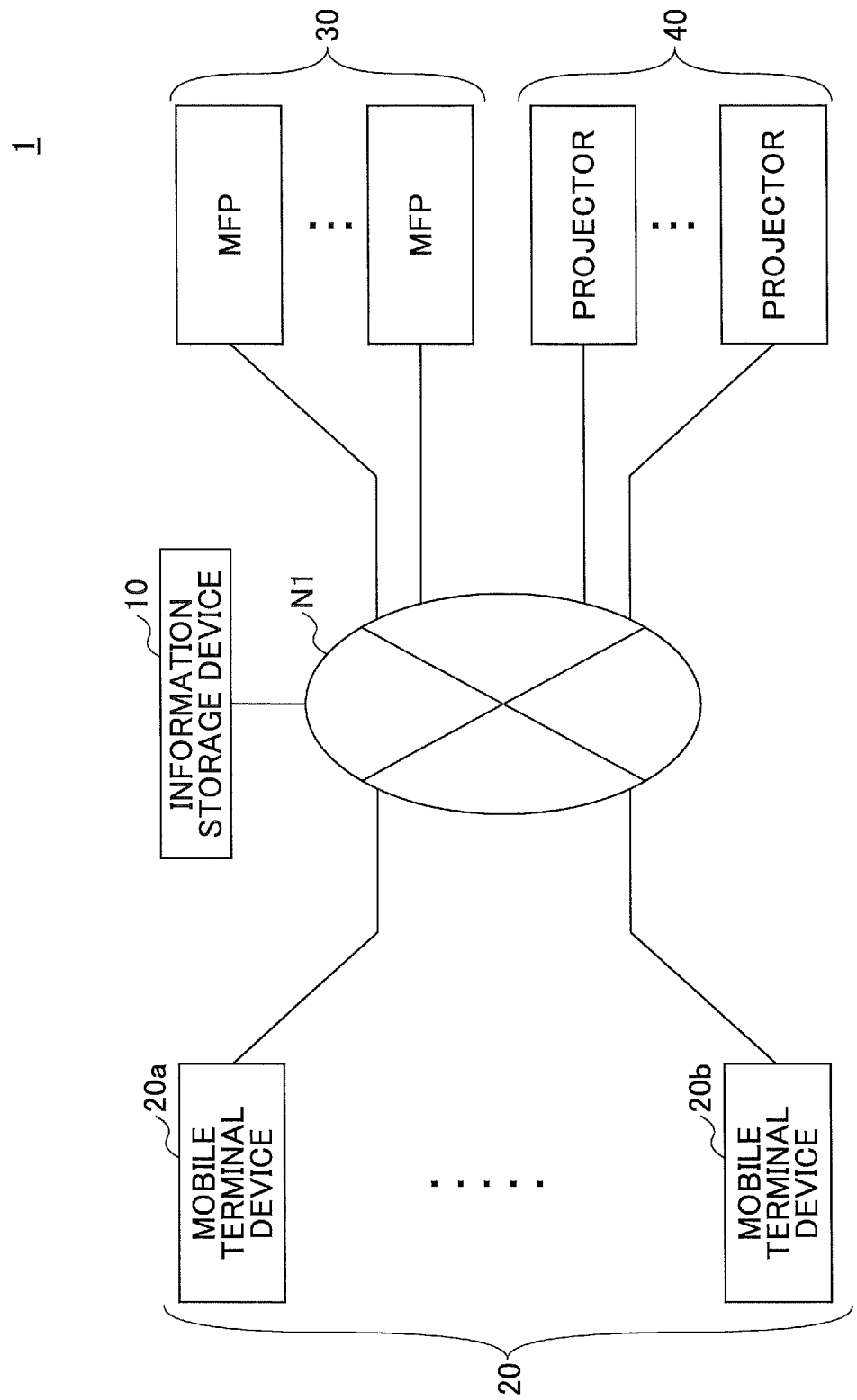
FIG. 1 illustrates an example of an information storage system according to a first embodiment.

FIG. 1 illustrates an example of an information storage system according to a first embodiment. An information storage system 1 illustrated in FIG. 1 includes an information storage device 10, at least one mobile terminal device 20, at least one MFP (multifunction peripheral) 30, and at least one projector 40, which are connected to a network N1 such as LAN (Local Area Network).

The network N1 may be a network of a private environment such as an in-house network.

The information storage device 10 is a computer system that stores files that can be accessed from the mobile terminal device 20. The information storage device 10 stores files by using a file system that can set an access restriction for each user of the mobile terminal device 20. Furthermore, the information storage device 10 generates an access key described below and authenticates a received access key, in response to a request from the mobile terminal device 20. Note that the information storage device 10 may be distributed across a plurality of computers.

The mobile terminal device 20 is an example of an information processing device carried and operated by a user. The information processing device may be any device that can be carried and operated by a user, such as a smartphone, a tablet terminal, a mobile phone, and a notebook PC. The mobile terminal device 20 can access the information storage device 10 and operate (read, write, etc.) files stored in the information storage device 10. Furthermore, as described below, the mobile terminal device 20 generates a QR code (registered trademark) based on an access key acquired from the information storage device 10, and displays the QR code on a display of the mobile terminal device 20. Furthermore, the mobile terminal device 20 can read, with a camera, etc., the QR code displayed on the display of another mobile terminal device 20. Note that in the following descriptions, when two or more mobile terminal devices 20 are to be distinguished from each other, they described as a mobile terminal device 20a, mobile terminal device 20b, etc. Note that a QR code is a matrix type two-dimensional code.

The MFP 30 includes an image pickup function, an image forming function, and a communication function, and can be used as a printer, a fax machine, a scanner, and a copier.

The projector 40 has a projection function and a communication function.

Note that the above information storage system 1 is one example, and may include various electronic devices other than the above. Examples of various electronic devices are an electronic blackboard (interactive white board), a television conference terminal, a camera, a microphone, and a monitor.

Figure 2:
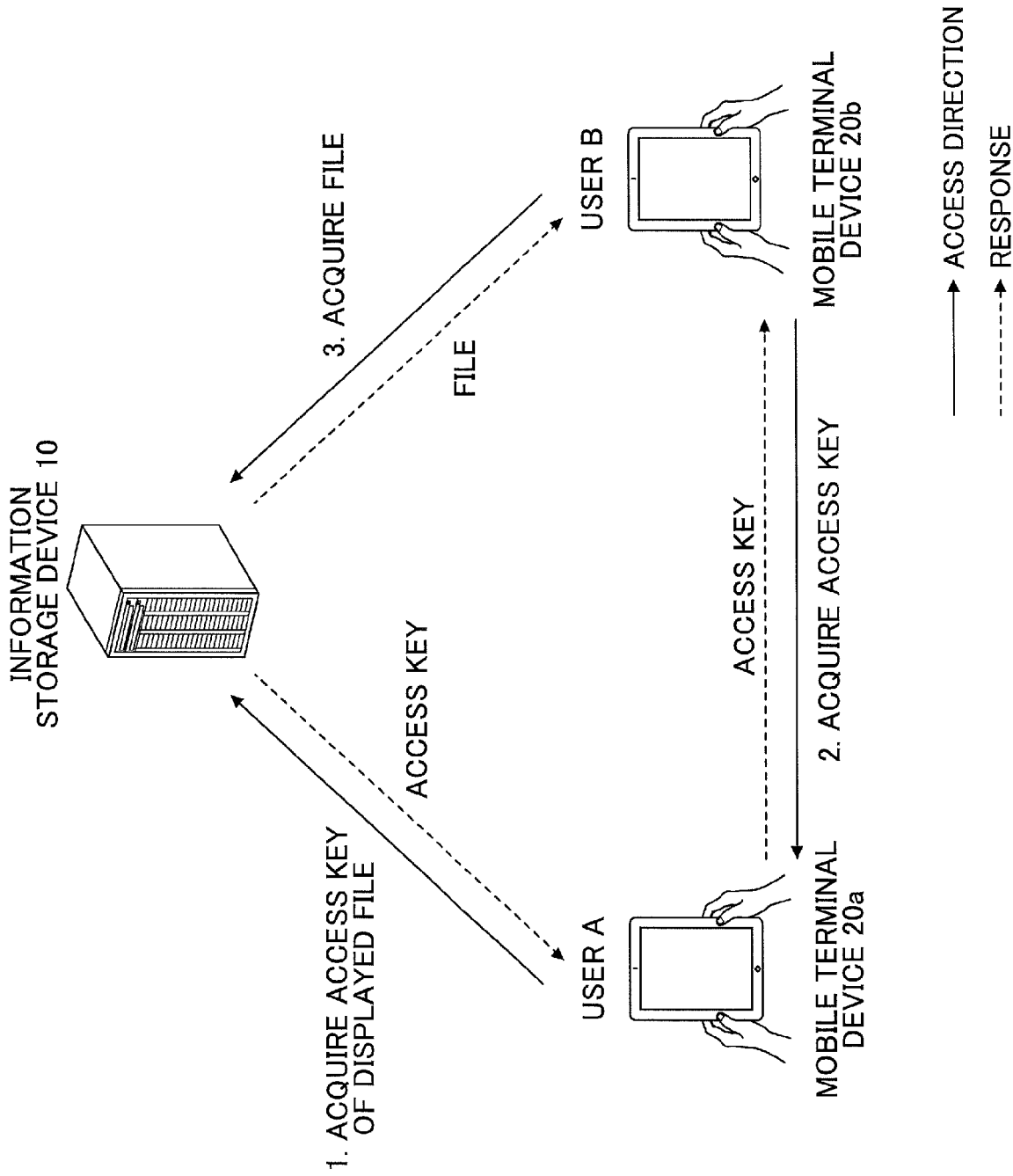
FIG. 2 illustrates an example of a usage scene according to the first embodiment.

A description is given of a usage scene of the information storage system 1 according to the present embodiment. FIG. 2 illustrates an example of a usage scene according to the present embodiment. A user A accesses the information storage system 1 by using the mobile terminal device 20a, and displays a file stored in a personal folder, on the mobile terminal device 20a. An access restriction is set for the personal folder of the user A, and the personal folder of the user A cannot be accessed from devices other than the mobile terminal device 20a of the user A.

A description is given of a case of displaying the file displayed on the mobile terminal device 20a of the user A, on the mobile terminal device 20b of the user B (sharing a file between the mobile terminal device 20a and the mobile terminal device 20b).

First, the mobile terminal device 20a of the user A makes a request to acquire an access key of the displayed file, to the information storage device 10. The information storage device 10 generates an access key and sends the access key to the mobile terminal device 20a. Next, the mobile terminal device 20a passes the acquired access key to the mobile terminal device 20b of the user B. By sending this acquired access key to the information storage device 10, the mobile terminal device 20b of the user B can acquire the file being displayed by the mobile terminal device 20a of the user A. That is to say, in the information storage system 1 according to the present embodiment, with respect to a file stored in a storage area of the information storage device 10 for which an access restriction is set, the file can be shared by acquiring an access key that enables access to this storage area. Note that an access key is an example of access information for accessing a predetermined storage area.

Hardware Configuration

Information Storage Device 10

Figure 3:
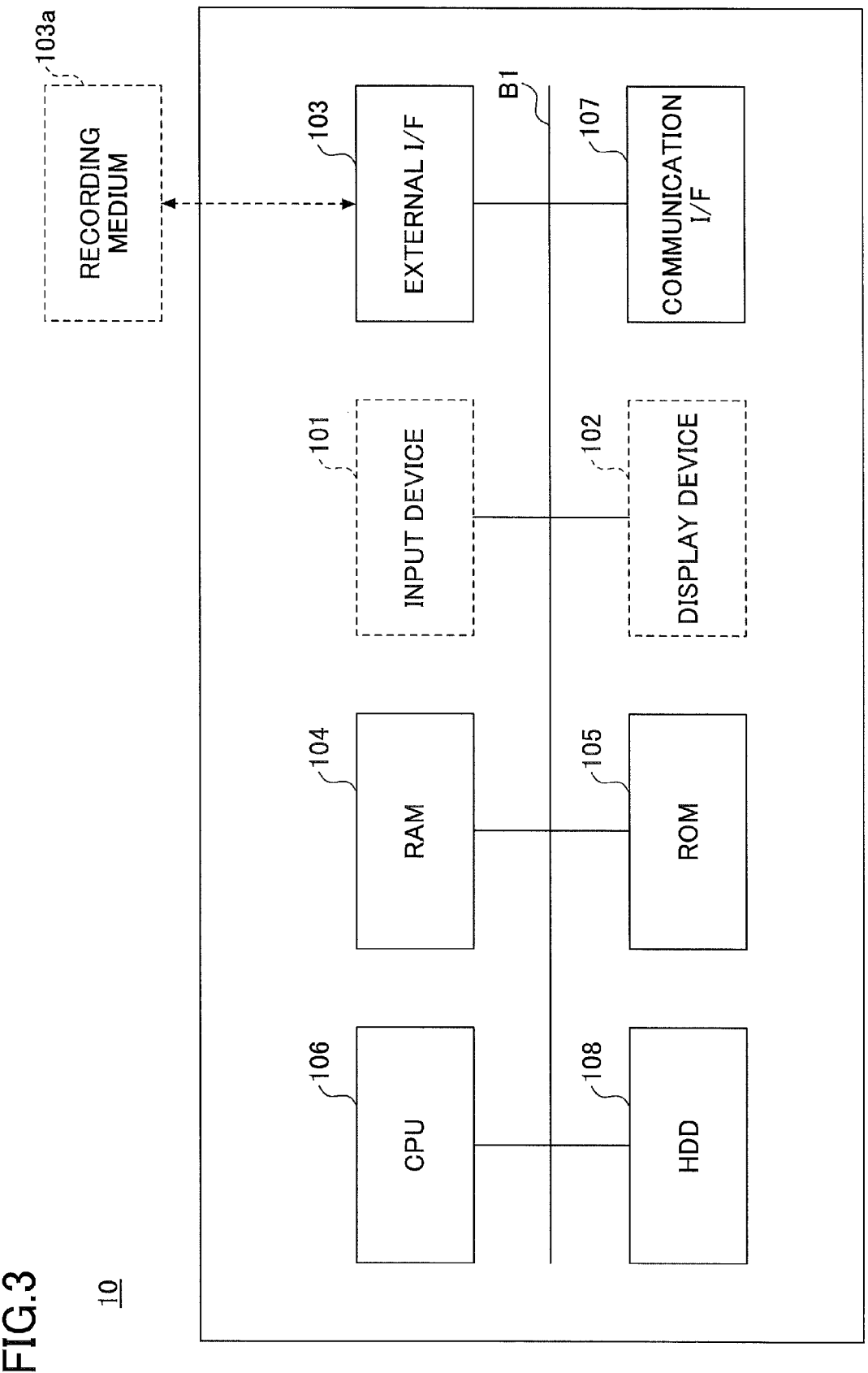
FIG. 3 illustrates a hardware configuration of an example of an information storage device according to the first embodiment.

For example, the information storage device 10 is realized by the information storage device 10 having a hardware configuration as illustrated in FIG. 3. FIG. 3 illustrates a hardware configuration of an example of the information storage device 10 according to the first embodiment.

The information storage device 10 illustrated in FIG. 3 includes an input device 101, a display device 102, an external I/F 103, a RAM 104, a ROM 105, a CPU 106, a communication I/F 107, and a HDD 108, which are connected to each other by a bus B1.

The input device 101 includes a keyboard and a mouse, and is used for inputting various operation signals to the information storage device 10. The display device 102 includes a display, and displays processing results by the information storage device 10. Note that the input device 101 and/or the display device 102 are not essential to the information storage device 10, and may thus be omitted.

The communication I/F 107 is an interface for connecting the information storage device 10 to the network N1. Accordingly, the information storage device 10 can perform data communication with other devices via the communication I/F 107.

The HDD 108 is a non-volatile storage device storing programs and data. The stored programs and data include an OS (Operating System) that is the basic software for controlling the entire information storage device 10, and application software for providing various functions on the OS. Furthermore, the HDD 108 manages the stored programs and data by a predetermined file system and/or a DB (database).

The external I/F 103 is an interface between the information storage device 10 and an external device. An external device is, for example, a recording medium 103a. Accordingly, the information storage device 10 can perform reading and/or writing with respect to the recording medium 103a via the external I/F 103. Note that the recording medium 103a may be a flexible disk, a CD, a DVD (Digital Versatile Disk), a SD memory card, a USB memory (Universal Serial Bus memory), etc.

The ROM 105 is a non-volatile semiconductor memory (storage device) that can store programs and data even after the power is turned off. The ROM 105 stores programs and data such as a BIOS (Basic Input/Output System) that is executed when the information storage device 10 is activated, OS settings, and network settings. The RAM 104 is a volatile semiconductor memory (storage device) that temporarily stores programs and data.

The CPU 106 is a processor that realizes control and functions of the entire information storage device 10, by loading the programs and data from storage devices such as the ROM 105 and the HDD 108 into the RAM 104, and executing processes.

The information storage device 10 according to the present embodiment can realize various processes as described below, by the above hardware configuration.

Mobile Terminal Device 20

Figure 4:
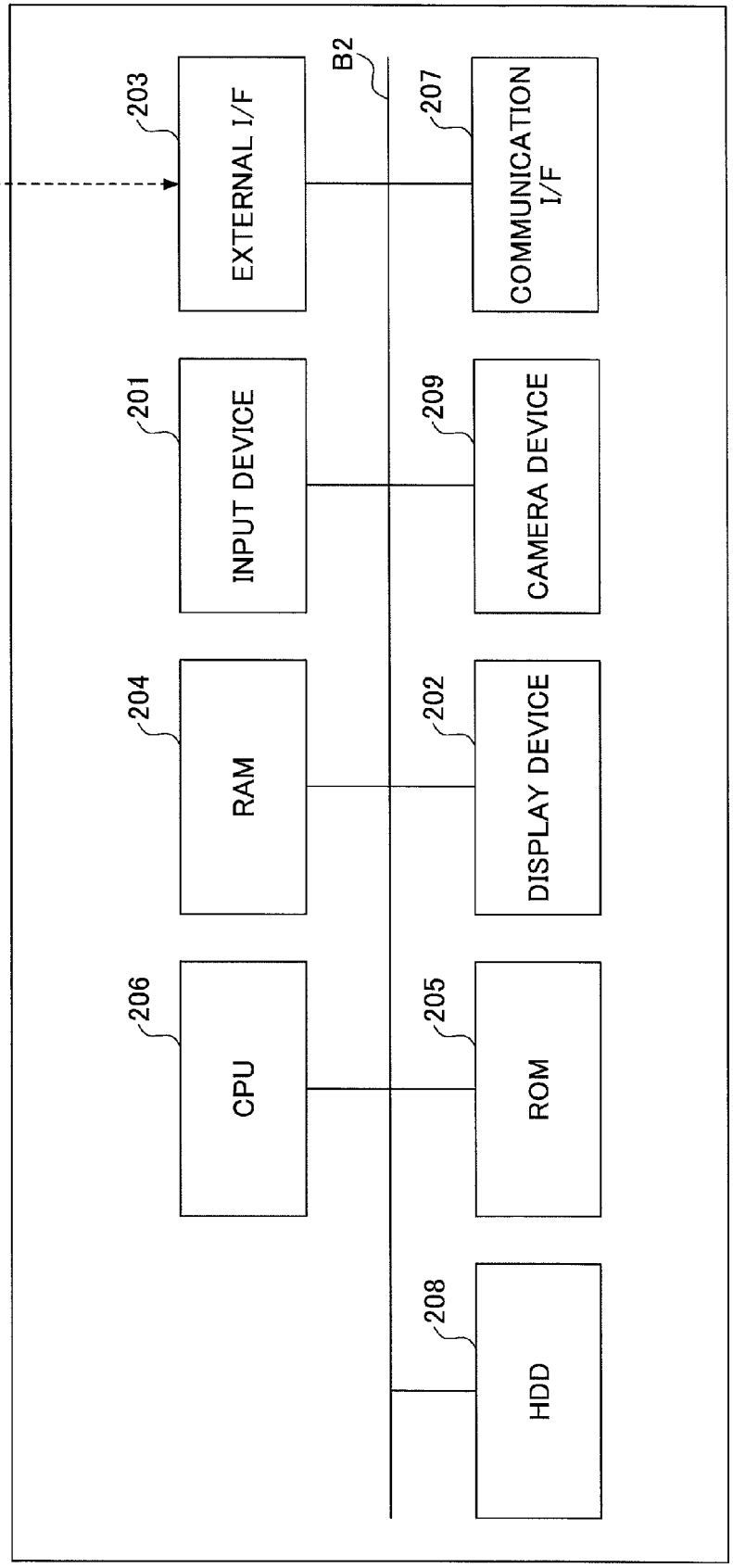
FIG. 4 illustrates a hardware configuration of an example of a mobile terminal device according to the first embodiment.

For example, the mobile terminal device 20 is realized by the mobile terminal device 20 having a hardware configuration as illustrated in FIG. 4. FIG. 4 illustrates a hardware configuration of an example of the mobile terminal device 20 according to the first embodiment.

The mobile terminal device 20 illustrated in FIG. 4 includes a input device 201, a display device 202, an external I/F 203, a RAM 204, a ROM 205, a CPU 206, a communication I/F 207, a HDD 208, and a camera device 209, which are connected to each other by a bus B2. Note that a recording medium 203a may be a RFID (Radio Frequency Identifier) tag or a NFC (Near field communication) tag, or a card (RFID card, NFC card) including these tags. Accordingly, the mobile terminal device 20 can perform reading and/or writing of information stored in a RFID tag or a NFC tag via the external I/F 203.

The input device 201, the display device 202, the external I/F 203, the RAM 204, the ROM 205, the CPU 206, the communication I/F 207, and the HDD 208 are the same as the input device 101, the display device 102, the external I/F 103, the RAM 104, the ROM 105, the CPU 106, the communication I/F 107, and the HDD 108, respectively, and therefore descriptions thereof are omitted.

The camera device 209 is a camera for converting an object taken by an image pickup device into image data. Note that the camera device 209 is capable of taking still images and/or video images.

The mobile terminal device 20 according to the present embodiment can realize various processes as described below, by the above hardware configuration.

Software Configuration

Information Storage Device 10

Figure 5:
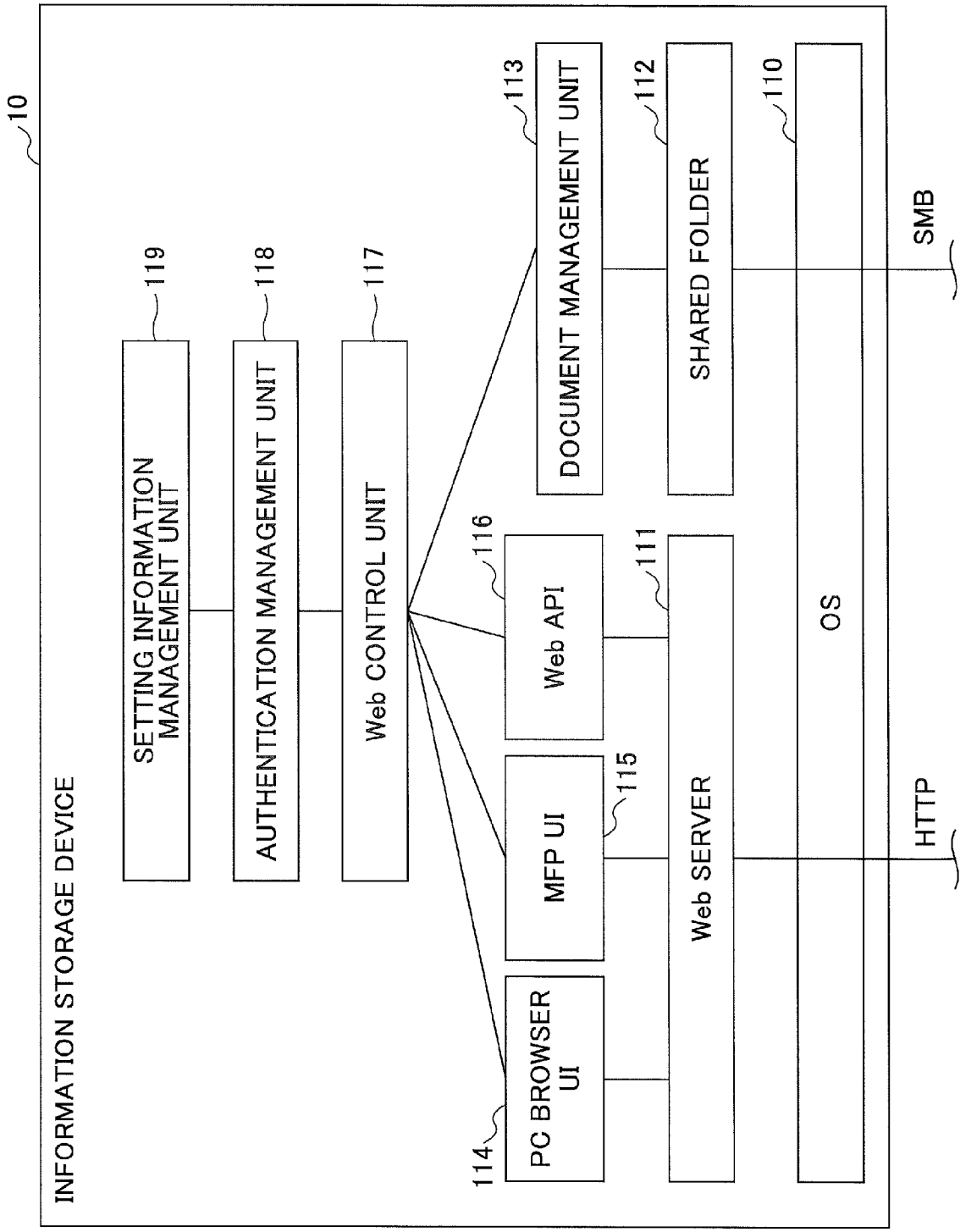
FIG. 5 is a process block diagram of an example of an information storage device according to the first embodiment.

The information storage device 10 according to the present embodiment is realized by, for example, the process blocks illustrated in FIG. 5. FIG. 5 is a process block diagram of an example of the information storage device 10 according to the first embodiment. The information storage device 10 realizes an OS 110, a web server 111, a shared folder 112, a document management unit 113, a PC browser UI 114, a MFP UI 115, a Web API 116, a Web control unit 117, an authentication management unit 118, and a setting information management unit 119, by executing programs.

The OS 110 is an operating system of the information storage device 10, and controls the entire system. The OS 110 is, for example, Windows (registered trademark), and Linux (registered trademark).

The web server 111 is software for transmitting/receiving information by HTTP (Hyper Text Transfer Protocol). The web server 111 is, for example, Apache Tomcat and IIS (registered trademark).

The shared folder 112 is a folder that is open to the public in the network N1 by a SMB (Server Message Block) protocol. The user can access the shared folder 112 by using an information processing device such as the mobile terminal device 20.

The document management unit 113 manages a file placed in the shared folder 112, and performs a process for converting data in response to a request from the Web control unit 117.

The PC browser UI 114 displays a setting screen of the information storage device 10 according to a HTTP request. For example, the user can change various settings of the information storage device 10 by using the web browser of the PC.

The MFP UI 115 displays a print screen and a scan screen according to a HTTP request. For example, the user can perform printing and scanning operations of the MFP by using a browser function of the MFP.

The Web API 116 receives a HTTP request, and performs a process according to the request. The Web API 116 gives a response with respect to the processing results. For example, the Web API 116 is constituted by functions and classes.

Furthermore, the Web API 116 of the information storage device 10 may be provided, as SDK (software development kit), to the developer of an application installed in an information processing device. The developer of the application can develop the application by using the SDK. SDK may also be provided to a third vendor other than the provider of the information storage device 10. The third vendor can develop an application by using the SDK that has been provided. The application that has been developed by developing SDK can be installed in an information processing device.

By providing the Web API 116 of the information storage device 10 as SDK, not only an application developed by the provider of the information storage device 10, but also an application developed by a third vendor, can be installed in the information processing device.

The authentication management unit 118 determines whether the HTTP request received by the Web API 116, is from a legitimate user. That is to say, the authentication management unit 118 performs user authentication based on authentication information included in the HTTP request. Furthermore, the authentication management unit 118 generates an access key for accessing the file displayed by the mobile terminal device 20 in response to a request from the mobile terminal device 20.

The setting information management unit 119 manages the device information and user settings of various electronic devices connected to the information storage system 1.

Mobile Terminal Device 20

Figure 6:
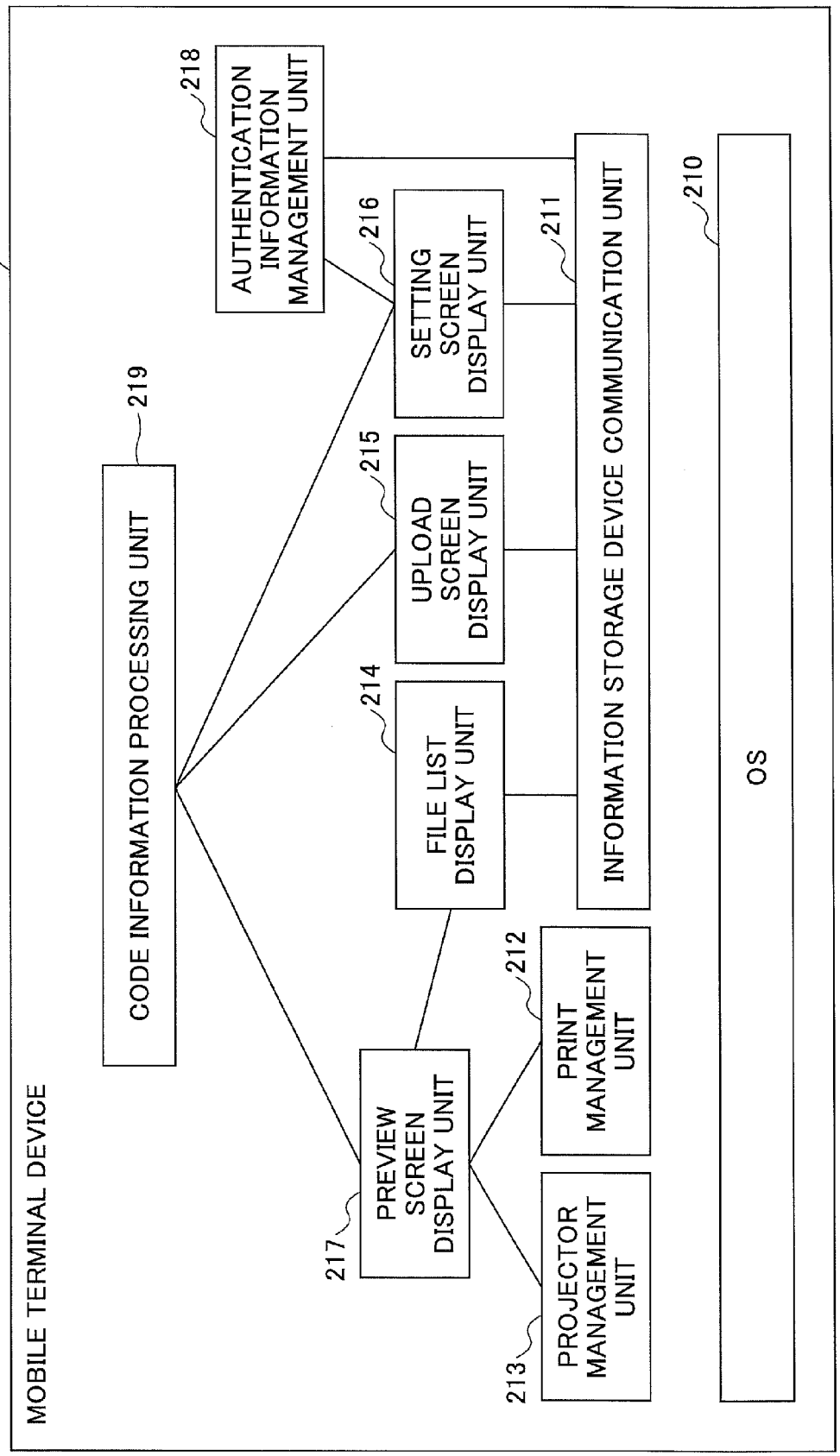
FIG. 6 is a process block diagram of an example of the mobile terminal device according to the first embodiment.

The mobile terminal device 20 according to the present embodiment is realized by, for example, the process blocks illustrated in FIG. 6. FIG. 6 is a process block diagram of an example of the mobile terminal device 20 according to the first embodiment. The mobile terminal device 20 realizes an OS 210, an information storage device communication unit 211, a print management unit 212, a projector management unit 213, a file list display unit 214, an upload screen display unit 215, a setting screen display unit 216, a preview screen display unit 217, an authentication information management unit 218, and a code information processing unit 219, by executing programs.

The OS 210 is an operating system of the mobile terminal device 20, and controls the entire system. The OS 210 is, for example, iOS, Android (registered trademark), Windows Phone, and BlackBerry.

The information storage device communication unit 211 transmits/receives information by HTTP to/from the Web API 116 of the information storage device 10. The information storage device communication unit 211 adds, to HTTP, the authentication information managed by the authentication information management unit 218 when transmitting/receiving information to/from the information storage device 10. Note that the authentication information management unit 218 manages, for example, a pair of a user ID and a password, as the authentication information.

Note that the file list display unit 214, the upload screen display unit 215, and the setting screen display unit 216 use the information storage device communication unit 211 to acquire information stored in the information storage device 10 and to make a process request to the information storage device 10.

The print management unit 212 searches for a MFP connected to the information storage system 1. The print management unit 212 registers a MFP in the information storage device 10. Furthermore, the print management unit 212 sends a file, which is stored in the information storage device 10, to a MFP connected to the information storage system 1, and requests a print process.

The projector management unit 213 searches for a projector connected to the information storage system 1. The projector management unit 213 registers a projector in the information storage device 10. Furthermore, the projector management unit 213 sends a file stored in the information storage device 10 to a projector connected to the information storage system 1, and requests a projection process.

The file list display unit 214 causes the display device 202 of the mobile terminal device 20 to display a list of files stored in the information storage device 10. For example, the list of files displayed by the file list display unit 214 is a list of files stored in a folder (folder to which an access right is applied) that can be accessed by the user by using the mobile terminal device 20.

The upload screen display unit 215 causes the display device 202 of the mobile terminal device 20 to display a menu screen for uploading a file in the information storage device 10 (for storing a file in a storage area of the information storage device 10). Furthermore, the upload screen display unit 215 uses the information storage device communication unit 211 to upload a file in the information storage device 10.

Note that methods of uploading a file in the information storage device 10 include a method of uploading a file stored in the HDD 208 of the mobile terminal device 20, and a method of uploading image data taken by the camera device 209 of the mobile terminal device 20. Furthermore, for example, by reading, with the mobile terminal device 20, a QR code displayed on the display screen of the MFP connected to the information storage system 1, the data scanned by this MFP can be uploaded.

The setting screen display unit 216 causes the display device 202 of the mobile terminal device 20 to display a screen for registering the mobile terminal device 20 in the information storage device 10. Furthermore, the setting screen display unit 216 causes the display device 202 of the mobile terminal device 20 to display setting information of the mobile terminal device 20.

The preview screen display unit 217 causes the display device 202 of the mobile terminal device 20 to display a preview screen of a file selected by the user, in the list of files displayed on the display device 202 of the mobile terminal device 20 by the file list display unit 214.

The code information processing unit 219 analyzes the code information read by the camera device 209 of the mobile terminal device 20. The code information is, for example, a QR code. Furthermore, the code information processing unit 219 generates code information (for example, a QR code) from the access key generated by the authentication management unit 118 of the information storage device 10.

Details of Process

In the following, a detailed description is given of a process of the information storage system 1 according to the present embodiment.

Figure 7:
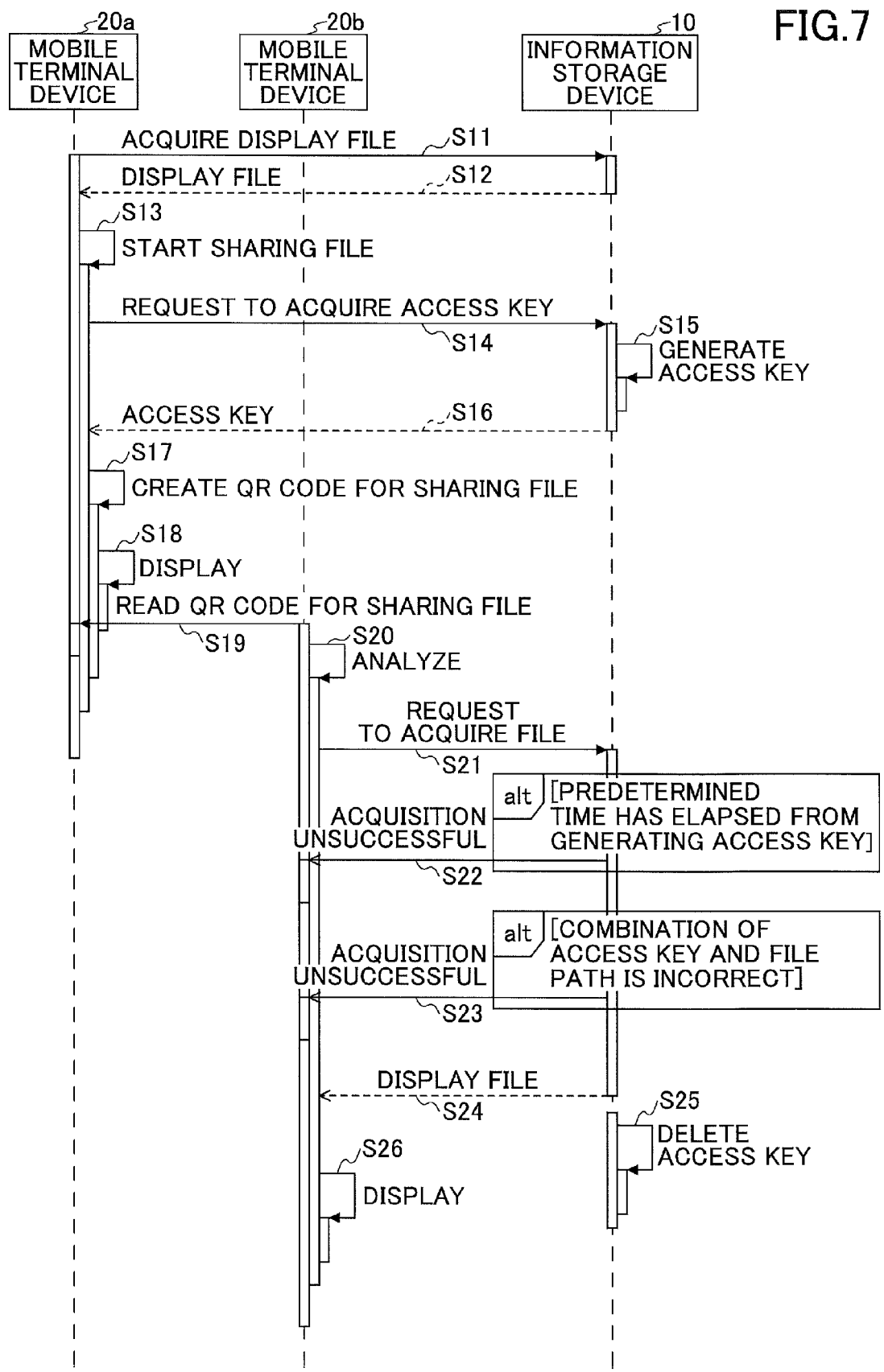
FIG. 7 is a sequence diagram of an example of processing procedures of the information storage system according to the first embodiment.

FIG. 7 is a sequence diagram of an example of processing procedures of the information storage system 1 according to the first embodiment.

A user A operates the mobile terminal device 20a, and makes a request to acquire a file stored in the information storage device 10, to the information storage device 10 (step S11). For example, by selecting a file from the list of files displayed by the file list display unit 214 of the mobile terminal device 20a, it is possible to make a request to acquire the selected file. Note that the selected file may be a file stored in the personal folder of the user A (a folder for which an access right is applied only to the user A). Note that the personal folder is a folder for which an access right is applied only to a predetermined user in the shared folder 112. Note that the request to acquire a file may be made, for example, by a HTTP request via the Web API 116 of the mobile terminal device 20a.

The information storage device 10 sends the requested file to the mobile terminal device 20a (step S12). At this time, the authentication management unit 118 of the information storage device 10 performs user authentication for the mobile terminal device 20a of the user A. For example, the authentication management unit 118 performs user authentication based on the authentication information applied to the HTTP request received by the information storage device 10. When the authentication is successful, the information storage device 10 sends the requested file to the mobile terminal device 20a. Note that when the authentication is unsuccessful, the information storage device 10 sends error information to the mobile terminal device 20a.

When the file sent from the information storage device 10 is received in step S12, the mobile terminal device 20a displays the contents of the received file on the display device 202.

The user A operates the mobile terminal device 20a, and performs a share start operation, i.e., an operation to start sharing the file displayed on the display device 202 (step S13). The share start operation is an operation for acquiring the access key for displaying, on another mobile terminal device 20, the file being displayed by the mobile terminal device 20a. Note that the share start operation may be performed by, for example, pressing a predetermined button displayed on the display device 202 of the mobile terminal device 20a.

The mobile terminal device 20a makes a request to acquire an access key, to the information storage device 10 (step S14). Note that the request to acquire an access key includes a file path of the file displayed by the mobile terminal device 20a (address information such as the storage location of the file in the information storage device 10). The authentication management unit 118 of the information storage device 10 generates an access key in response to the request to acquire an access key from the mobile terminal device 20a (step S15), and sends the generated access key to the mobile terminal device 20a (step S16). Note that the information storage device 10 saves the access key generated in step S15, in a storage area of the information storage device 10.

Figure 8:
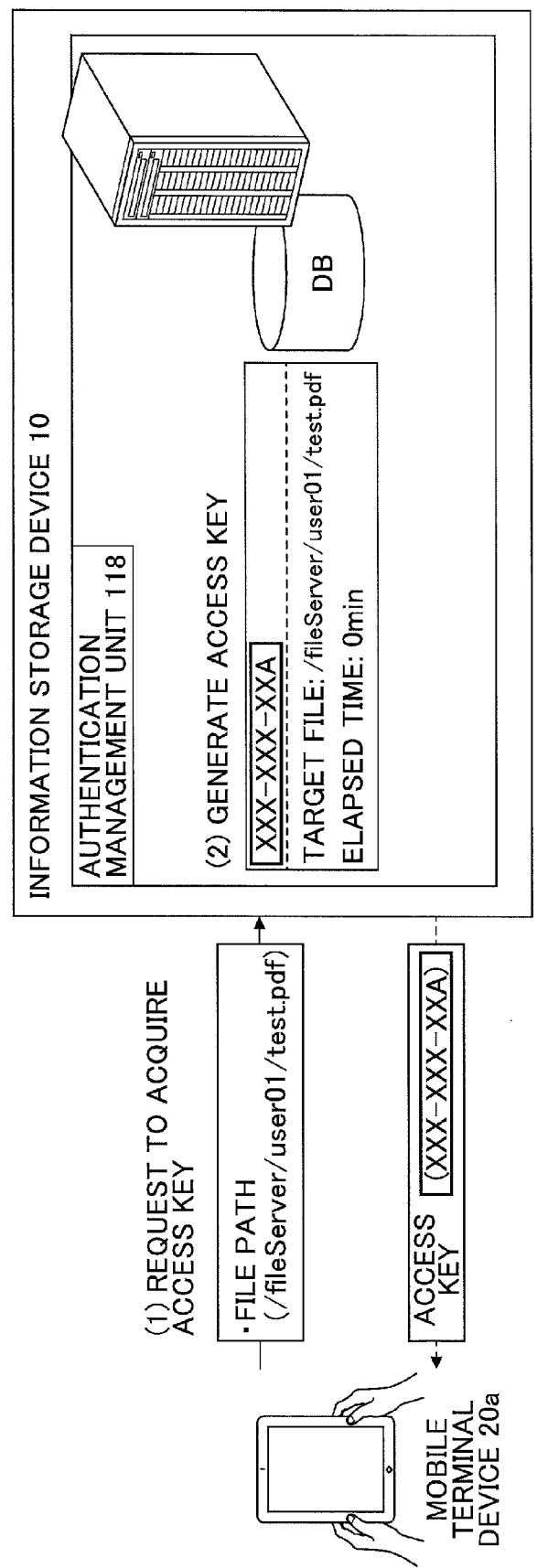
FIG. 8 illustrates an example of a method of acquiring an access key.

FIG. 8 illustrates an example of a method of acquiring an access key. The mobile terminal device 20a makes a request to acquire an access key including a file path, to the information storage device 10. The information storage device 10 generates an access key in response to a request to acquire an access key, and saves the access key in the storage area in association with the file path included in the access key acquisition request. Then, the information storage device 10 sends the generated access key to the mobile terminal device 20a. Note that the information storage device 10 also saves, for example, the elapsed time, in addition to the file path, in association with the access key in the storage area. The elapsed time is the time that has elapsed from when a the access key is generated. When the elapsed time reaches a predetermined time that has been set in advance, the access key becomes invalid (the access key is deleted from the storage area of the information storage device 10). Note that the predetermined time is an example of a first validity period of the access information.

Next, the code information processing unit 219 of the mobile terminal device 20a converts the information including the acquired access key into code information (step S17). In the present embodiment, the code information processing unit 219 converts the access key into a QR code. Note that the code information may be, for example, an SP code and a CP code, other than the QR code. The mobile terminal device 20a causes the display device 202 to display the QR code (step S18).

Figures 9, 10:
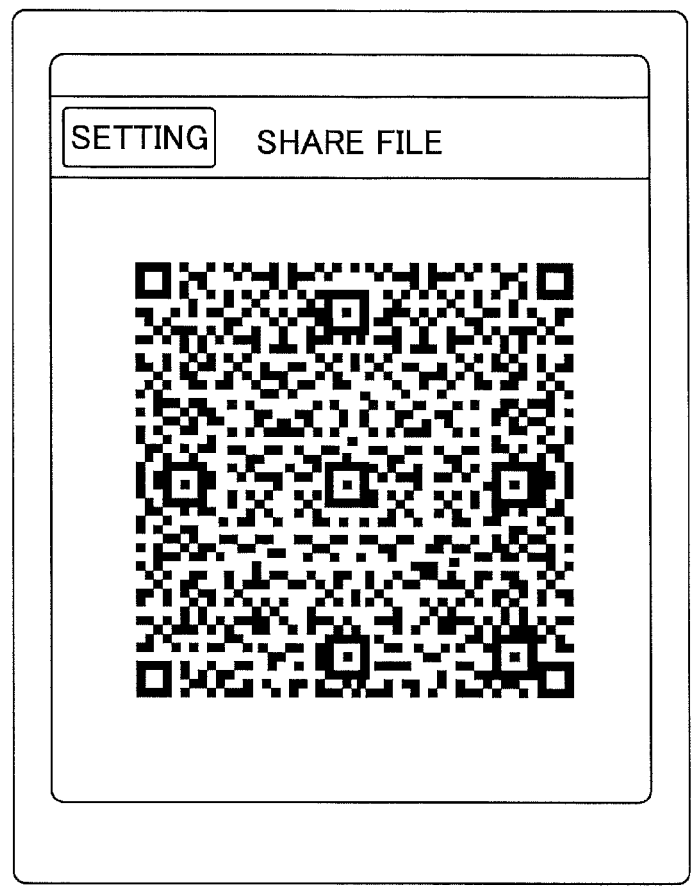
FIG. 9 is an image diagram of an example of a QR code.
FIG. 10 illustrates an example of information of the QR code.

FIG. 9 is an image diagram of an example of a QR code. The mobile terminal device 20a generates a QR code from the access key acquired from the information storage device 10, and causes the display device 202 of the mobile terminal device 20a to display the QR code.

FIG. 10 illustrates an example of information of the QR code. The QR code displayed on the display device 202 of the mobile terminal device 20a is read with the camera device 209, and is subjected to predetermined analysis. Accordingly, it is possible to acquire an access key (oneTimeAccessKey), a file path (filePath), and an IP address (serverAddress) of the information storage device 10.

Next, the mobile terminal device 20b of the user B reads the QR code displayed on the display device 202 of the mobile terminal device 20a with the camera device 209 of the mobile terminal device 20b (step S19). The code information processing unit 219 of the mobile terminal device 20b analyzes the read QR code, and acquires predetermined information (access key, file path, IP address), for example, as illustrated in FIG. 10 (step S20). Then, the mobile terminal device 20b makes a file acquisition request to the information storage device 10, including the access key and the file path acquired in step S20 (step S21). Note that at this time, the mobile terminal device 20b adds, to the file acquisition request, device information of the mobile terminal device 20b (for example, the owner ID, the device ID, and the device name of the mobile terminal device 20b).

The authentication management unit 118 of the information storage device 10 refers to the elapsed time of the access key included in the received file acquisition request, and determines whether a predetermined time, which has been set in advance, has elapsed from when the access key was generated (step S22). When a predetermined time, which has been set in advance, has elapsed, from when the access key was generated, the authentication management unit 118 of the information storage device 10 sends information indicating that the file acquisition is unsuccessful, to the mobile terminal device 20b. Accordingly, the sharing of the file is authorized only within a predetermined time from when the access key was generated, and therefore security is secured.

The authentication management unit 118 of the information storage device 10 determines whether the combination of the access key and the file path included in the received file acquisition request, is correct (step S23). That is to say, the authentication management unit 118 of the information storage device 10 determines whether the combination of the access key and the file path included in the received file acquisition request, matches the combination of the access key and the file path saved in association with each other in the storage area of the information storage device 10. When the combinations of the access key and the file path do not match (or there is no matching combination of the access key and the file path in the storage area of the information storage device 10), the authentication management unit 118 of the information storage device 10 sends information indicating that the file acquisition is unsuccessful, to the mobile terminal device 20b.

The information storage device 10 sends a file specified in the file path included in the received file acquisition request, to the mobile terminal device 20b (step S24). Then, the information storage device 10 deletes the access key saved in the storage area of the information storage device 10 (step S25). Accordingly, once the access key is used to share a file, the same access key cannot be used to share the file, and therefore security is secured (i.e., the access key of the present embodiment is a one-time key).

The mobile terminal device 20b displays the file received from the information storage device 10 on the display device 202 (step S26). Accordingly, the mobile terminal device 20b of the user B can use the access key to share and display a file in the personal folder of the user A to which an access restriction is applied.

Figure 11:
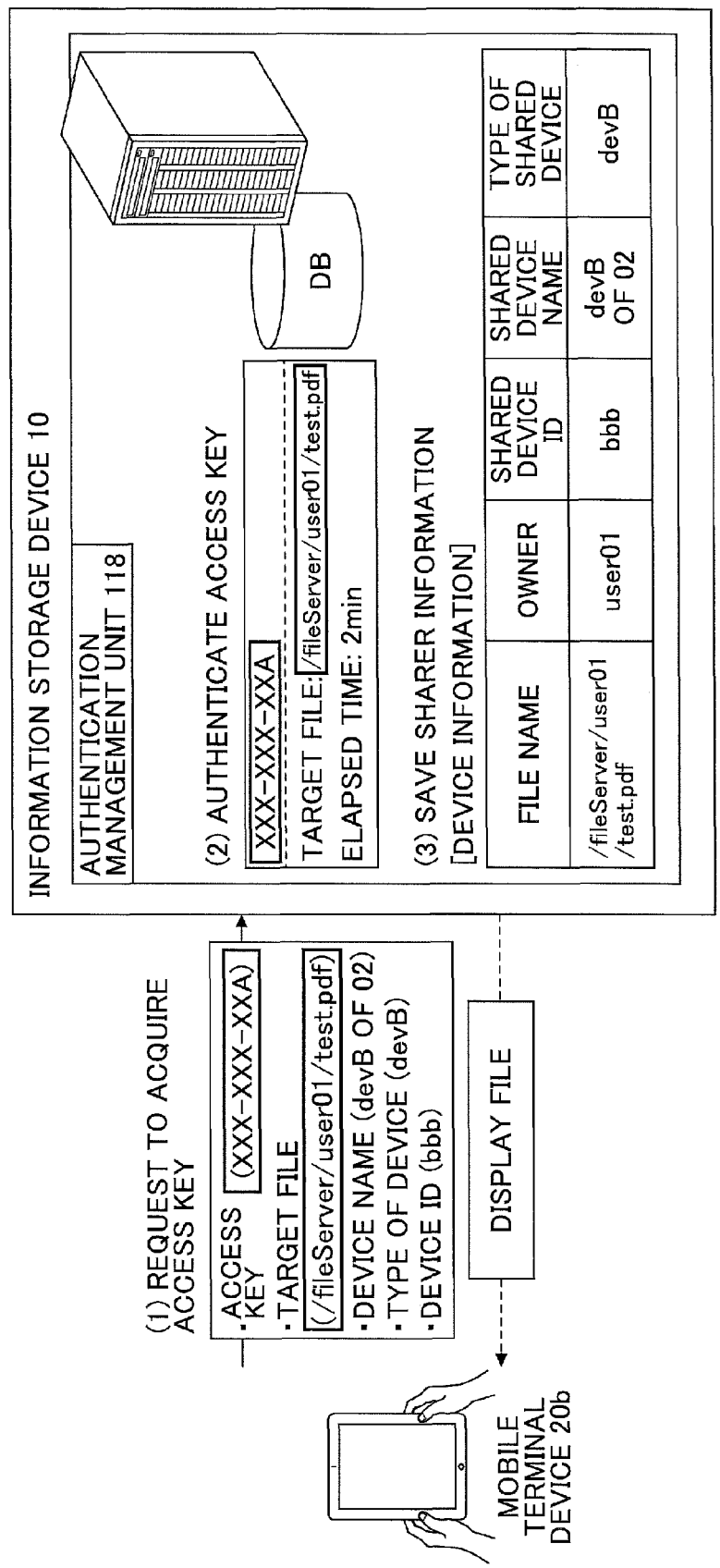
FIG. 11 illustrates an example of a method of authenticating an access key.

FIG. 11 illustrates an example of a method of authenticating an access key. The mobile terminal device 20b attaches the information illustrated in FIG. 12 to the file acquisition request, and sends the file acquisition request to the information storage device 10. FIG. 12 illustrates an example of information included in a file acquisition request. The file acquisition request includes, for example, an access key (oneTimeAccessKey), a file path (filePath), a terminal name (deviceName), a terminal type (deviceType), and a terminal ID (deviceID). The terminal name is an arbitrary name of the terminal set by the user. Terminal type is the product name of the terminal. The terminal ID is, for example, a MAC (Media Access Control) address of the terminal. Next, the information storage device 10 authenticates an access key from information included in the file acquisition request. Furthermore, the information storage device 10 saves various kinds of terminal information, as information relevant to the sharers of the file. Then, the information storage device 10 sends the file specified in the file path included in the file acquisition request, to the mobile terminal device 20b.

Figure 13:
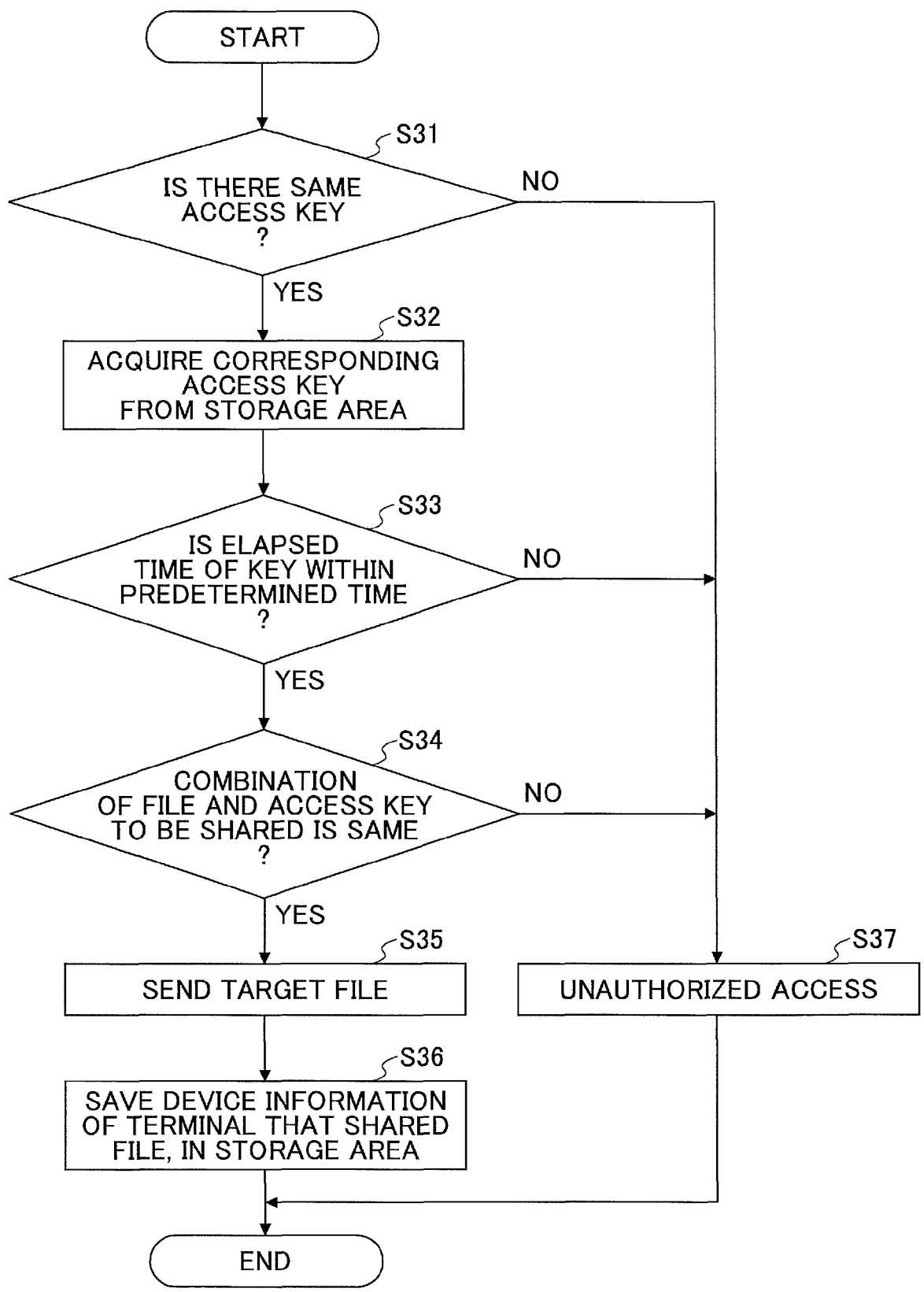
FIG. 13 is a flowchart of an example of an access key authentication process performed in the information storage device according to the first embodiment.

Next, a detailed description is given of the process of the method of authenticating an access key described with reference to FIG. 11. FIG. 13 is a flowchart of an example of an access key authentication process performed in the information storage device 10 according to the present embodiment.

The authentication management unit 118 of the information storage device 10 determines whether the same access key as the access key included in the file acquisition request from the mobile terminal device 20b, is included in the storage area of the information storage device 10 (step S31). When the same access key is included in the storage area of the information storage device 10, the process proceeds to step S32.

When the same access key as the access key included in the file acquisition request from the mobile terminal device 20b, is included in the storage area of the information storage device 10, the authentication management unit 118 of the information storage device 10 acquires the access key from the storage area (step S32). Note that at this time, when the access key is acquired, the access key is deleted from the storage area of the information storage device 10. Accordingly, once an access key is used, the access key can be invalidated.

The authentication management unit 118 of the information storage device 10 determines whether the elapsed time of the access key included in the file acquisition request is within a predetermined time (step S33). Accordingly, when a predetermined time has elapsed after acquiring the access key, the access key can be invalidated, and security is secured. When the elapsed time is within a predetermined time, the process proceeds to step S34.

The authentication management unit 118 of the information storage device 10 determines whether the combination of the access key and the file path included in the file acquisition request matches the combination of the access key and the file path acquired from the storage area of the information storage device 10 (step S34). Accordingly, an unauthorized file acquisition request can be prevented. When the combinations match, the process proceeds to step S35.

The authentication management unit 118 of the information storage device 10 sends, to the mobile terminal device 20b, the file specified in the file path included in the file acquisition request (step S35).

The authentication management unit 118 of the information storage device 10 saves the device information of the mobile terminal device 20b included in the file acquisition request, in the storage area of the information storage device 10 (step S36). Accordingly, information relevant to the sharers of the file displayed by the mobile terminal device 20a of the user A and the terminals sharing the file, can be saved. When the results of steps S31, S33, and S34 are negative, it is determined to be an unauthorized access (step S37).

By the above process, in the information storage system 1 according to the present embodiment, a file displayed by the mobile terminal device 20a of the user A can be displayed on the mobile terminal device 20b of the user B. This is performed by a method in which the user A operates the mobile terminal device 20a, acquires an access key, converts the access key into code information, and displays the code information on the display device 202. Then, the mobile terminal device 20b of the user B reads this code information with the camera device 209, and analyzes the code information, to acquire a file saved in the information storage device 10.

Furthermore, in the information storage system 1 according to the present embodiment, an access key for sharing a file by the mobile terminal device 20a and the mobile terminal device 20b is also saved in the storage area of the information storage device 10. When a request to authenticate the access key is received from the mobile terminal device 20b, the access key saved in the storage area is deleted. Accordingly, one access key can only be used once, and therefore security is secured. Furthermore, when a predetermined time has elapsed from when the access key is generated (issued), the access key is deleted from the storage area of the information storage device 10, so that the access key is invalidated.

Second Embodiment

Next, a description is given of the information storage system 1 according to a second embodiment. The information storage system 1 according to the second embodiment generates an access key in the mobile terminal device 20.

Note that the information storage system 1 according to the second embodiment has a system configuration, a hardware configuration, and a software configuration that are the same as those of the information storage system 1 according to the first embodiment, and therefore descriptions of a system configuration, a hardware configuration, and a software configuration are omitted.

Details of Process

Figure 14:
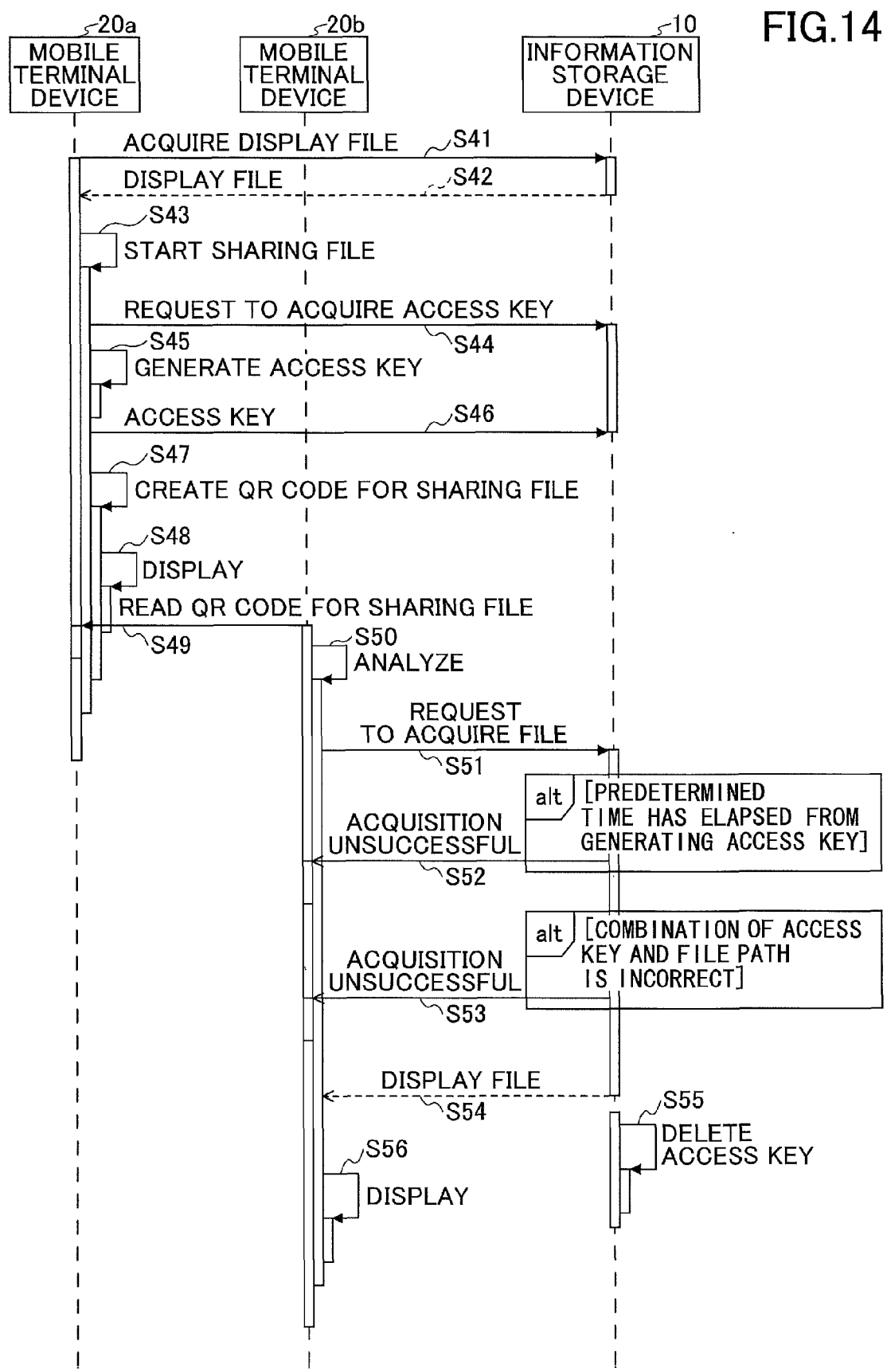
FIG. 14 is a sequence diagram of an example of processing procedures of the information storage system according to a second embodiment.

FIG. 14 is a sequence diagram of an example of processing procedures of the information storage system 1 according to the second embodiment. Note that the processes of steps S41 through S44 and S47 through 56 in the sequence diagram of FIG. 14 are the same as those of steps S11 through S14 and S17 through S26 in the sequence diagram of FIG. 7, and therefore descriptions thereof are omitted.

The mobile terminal device 20a of the user A generates an access key (step S45), and sends the generated access key to the information storage device 10 (step S46). Note that the information storage device 10 saves the access key acquired from the mobile terminal device 20a in the storage area.

By the above process, in the information storage system 1 according to the second embodiment, the mobile terminal device 20 can generate an access key. Accordingly, the processing load of the information storage device 10 associated with the generation of the access key can be distributed. Therefore, also in a case of generating access keys substantially at the same time in a plurality of mobile terminal devices 20 connected to the information storage system 1, it is possible to prevent the load of the process by the information storage device 10 from becoming excessively high.

Third Embodiment

Next, a description is given of the information storage system 1 according to a third embodiment. The information storage system 1 according to the third embodiment includes a number of times of performing authentication for the access key. That is to say, the authentication can be performed a predetermined number of times with a single access key.

Note that the information storage system 1 according to the third embodiment has a system configuration, a hardware configuration, and a software configuration that are the same as those of the information storage system 1 according to the first embodiment, and therefore descriptions of a system configuration, a hardware configuration, and a software configuration are omitted.

Details of Process

Figure 15:
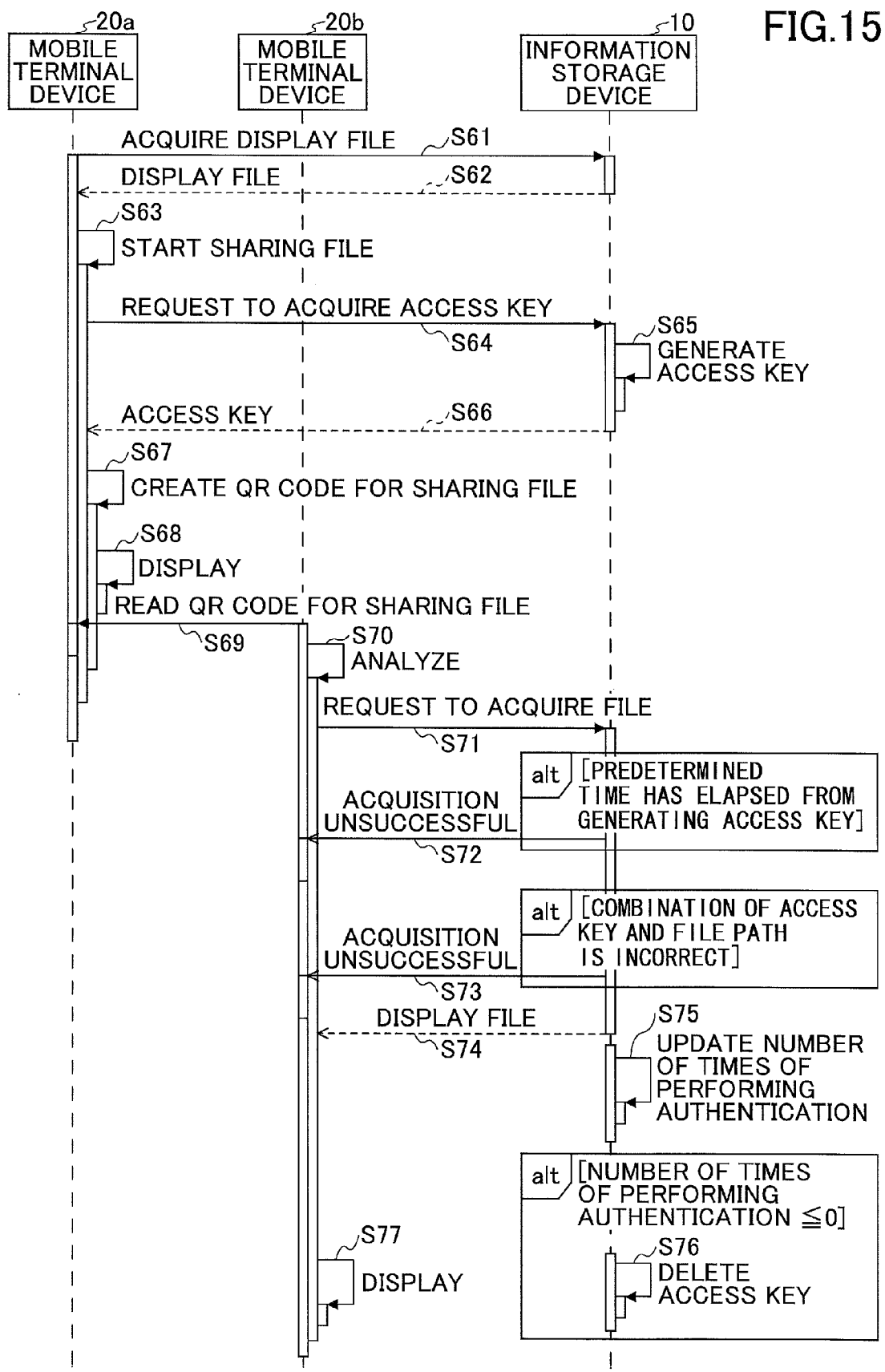
FIG. 15 is a sequence diagram of an example of processing procedures of the information storage system according to a third embodiment.

FIG. 15 is a sequence diagram of an example of processing procedures of the information storage system 1 according to the third embodiment. Note that the processes of steps S61 through S74 and S77 in the sequence diagram of FIG. 15 are the same as those of steps S11 through S24 and S26 in the sequence diagram of FIG. 7, and therefore descriptions thereof are omitted.

The authentication management unit 118 of the information storage device 10 updates the number of times of performing authentication included in the access key stored in the storage area of the information storage device 10 (step S75). The updating of the number of times of performing authentication is performed by, for example, decrementing the value of the number of times of performing authentication, by one.

The authentication management unit 118 of the information storage device 10 determines whether the number of times of performing authentication included in the access key stored in the storage area of the information storage device 10 is less than or equal to zero. When the number is less than or equal to zero, the authentication management unit 118 of the information storage device 10 deletes the access key from the storage area (step S76).

According to the above process, for example, when a file is shared by a plurality of mobile terminal devices 20, by setting a number of times of performing authentication corresponding to the number of mobile terminal devices 20, it is possible for the file to be shared among the plurality of mobile terminal devices 20. Specifically, for example, when a file is shared by three mobile terminal devices 20, the number of times of performing authentication is to be set as two times.

Fourth Embodiment

Next, a description is given of the information storage system 1 according to a fourth embodiment. In the information storage system 1 according to the fourth embodiment, a file is shared by the mobile terminal device 20a and the mobile terminal device 20b, only while the mobile terminal device 20a is displaying a predetermined screen. The information storage device 10 of the information storage system 1 according to the present embodiment saves, in the storage area, a second validity period indicating the valid time of an access key, in association with the access key. In the information storage system 1 according to the present embodiment, by using the second validity period, the mobile terminal device 20b can share the file only while the mobile terminal device 20a is displaying a predetermined screen.

Note that the information storage system 1 according to the fourth embodiment has a system configuration, a hardware configuration, and a software configuration that are the same as those of the information storage system 1 according to the first embodiment, and therefore descriptions of a system configuration, a hardware configuration, and a software configuration are omitted.

Details of Process

Figure 16:
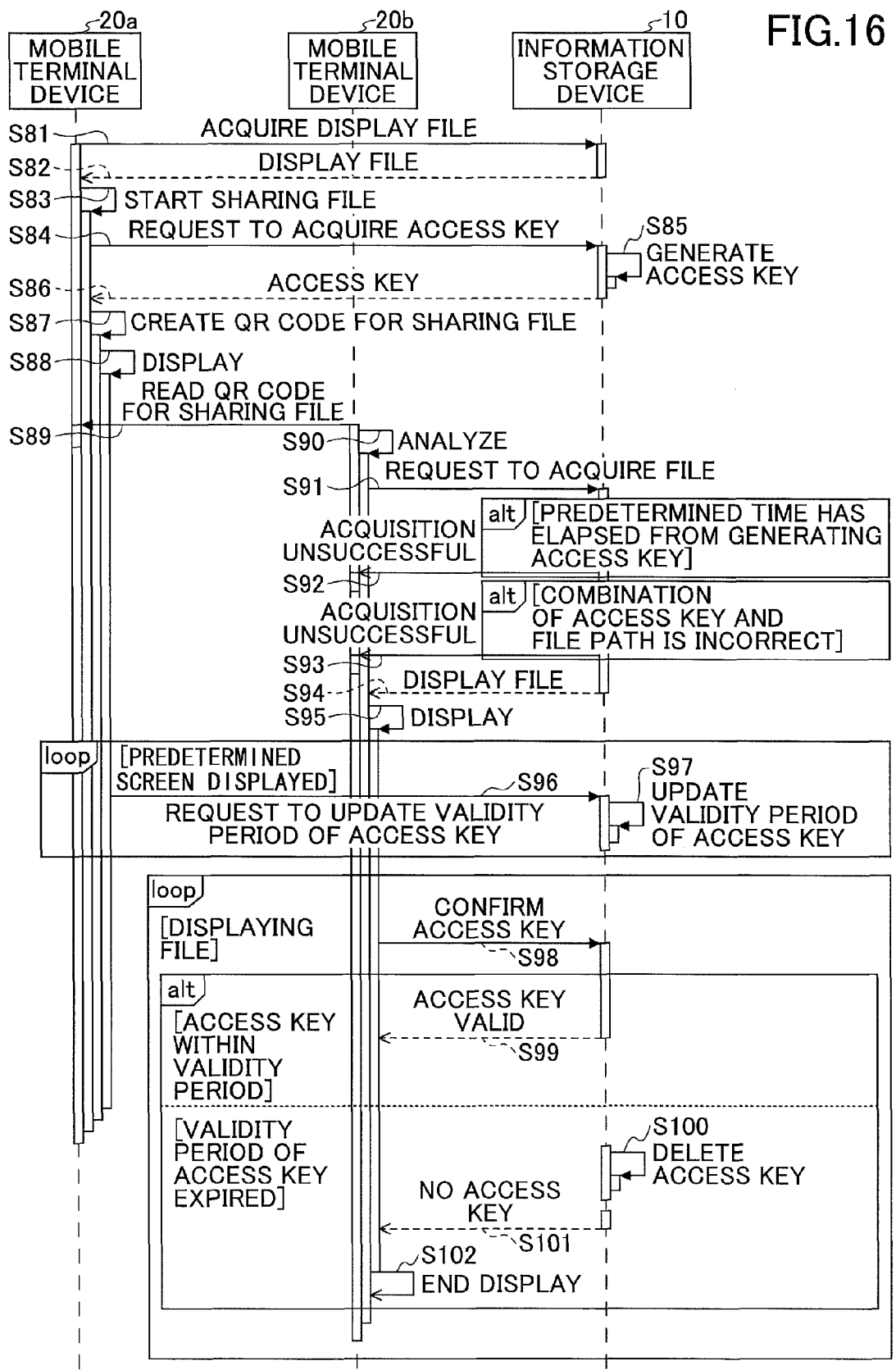
FIG. 16 is a sequence diagram of an example of processing procedures of the information storage system according to a fourth embodiment.

FIG. 16 is a sequence diagram of an example of processing procedures of the information storage system 1 according to the fourth embodiment. Note that the processes of steps S81 through S95 in the sequence diagram of FIG. 16 are the same as those of steps S11 through S26 in the sequence diagram of FIG. 7, and therefore descriptions thereof are omitted.

The mobile terminal device 20a of the user A displays a predetermined screen for sharing a file with the mobile terminal device 20b. Then, while this predetermined screen is displayed, the mobile terminal device 20a sends, to the information storage device 10, an update request of the second validity period of the access key at predetermined intervals (for example, intervals of one second or several seconds) (step S96). The predetermined screen displayed by the mobile terminal device 20a is a screen for allowing the mobile terminal device 20b to share the file, only while this predetermined screen is displayed. For example, the predetermined screen is the display screen of the QR code displayed in step S88, or a display screen of the file to be shared with the mobile terminal device 20b.

The information storage device 10 updates the second validity period of the access key (step S97). That is to say, for example, the information storage device 10 makes the update by extending the second validity period of the access key (for example, extend by the same number of seconds as that of the predetermined interval described above).

The mobile terminal device 20b of the user B confirms whether the second validity period of the access key has elapsed, with respect to the information storage device 10 at predetermined intervals, while the file acquired in step S94 is displayed (step S98). When the second validity period of the access key has not elapsed, the information storage device 10 makes a response including information indicating that the access key is valid, and the mobile terminal device 20b continues displaying the file (step S99).

In this case, when the mobile terminal device 20a of the user A ends the display of the predetermined screen, the second validity period of the access key is not updated. Therefore, when the second validity period has elapsed, the information storage device 10 deletes the access key (step S100). Therefore, when the mobile terminal device 20b confirms whether the second validity period has elapsed in step S98, and the second validity period has elapsed and the access key is deleted, the information storage device 10 makes a response including information indicating that the access key is invalid (does not exist) to the mobile terminal device 20b (step S101). Then, the mobile terminal device 20b ends the display of the file (step S102).

According to the above process, in the information storage system 1 according to the fourth embodiment, it is possible to implement control to display the file at the mobile terminal device 20b while the mobile terminal device 20a is displaying a predetermined screen. Accordingly, the period during which a file is displayed at the mobile terminal device 20b can be strictly controlled.

Fifth Embodiment

Next, a description is given of the information storage system 1 according to a fifth embodiment. In the information storage system 1 according to the fifth embodiment, the second validity period of the access key is updated, while the mobile terminal device 20a can read information from a predetermined recording medium 203a (for example, an RFID tag and a NFC tag). That is to say, only while an RFID tag or a NFC tag is brought near the mobile terminal device 20a, the second validity period of the mobile terminal device 20a is updated.

Note that the information storage system 1 according to the fifth embodiment has a system configuration, a hardware configuration, and a software configuration that are the same as those of the information storage system 1 according to the first embodiment, and therefore descriptions of a system configuration, a hardware configuration, and a software configuration are omitted.

Details of Process

Figure 17:
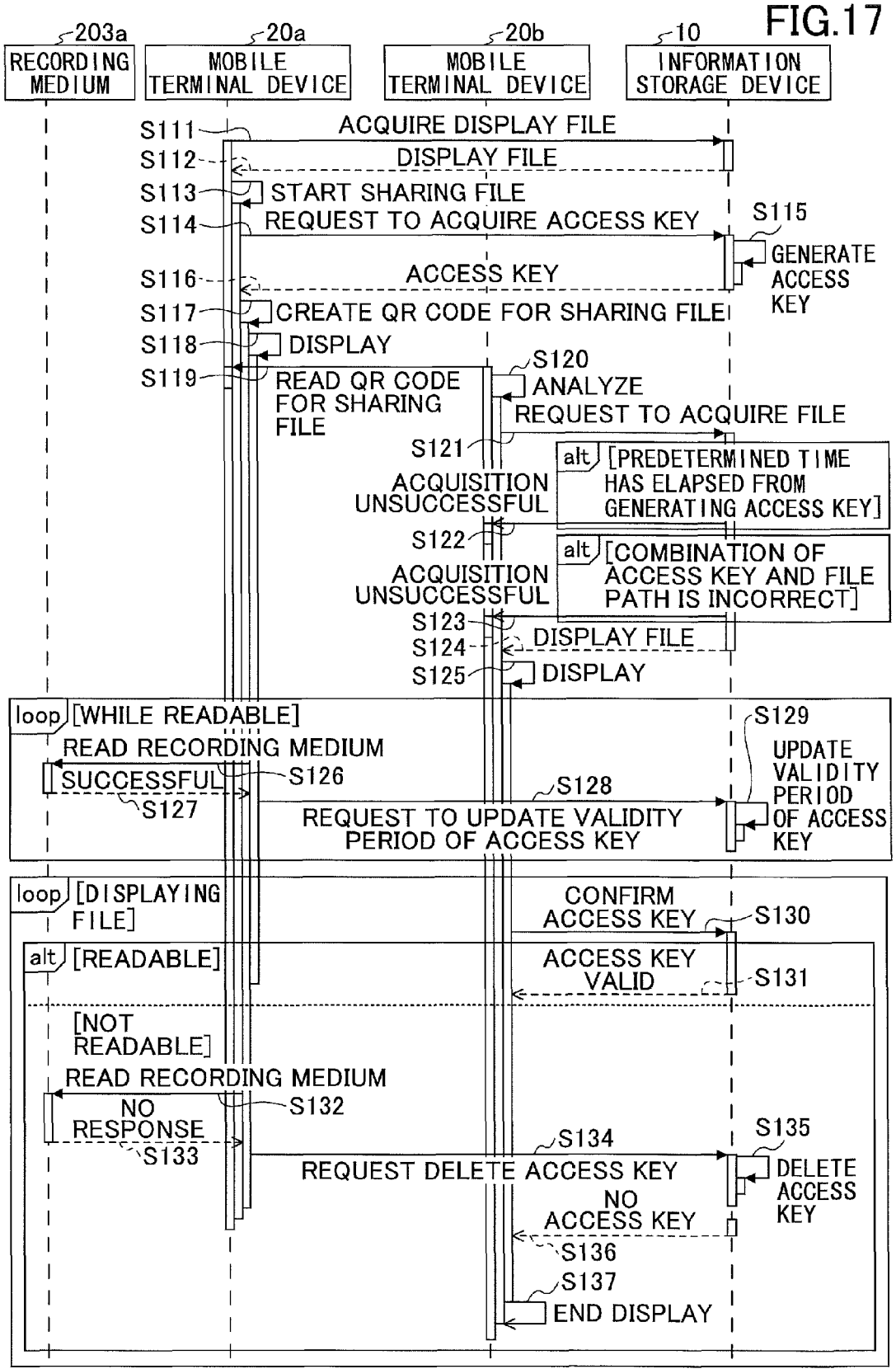
FIG. 17 is a sequence diagram of an example of processing procedures of the information storage system according to a fifth embodiment.

FIG. 17 is a sequence diagram of an example of processing procedures of the information storage system 1 according to the fifth embodiment. Note that the processes of steps S111 through S125 in the sequence diagram of FIG. 17 are the same as those of steps S81 through S95 in the sequence diagram of FIG. 16, and therefore descriptions thereof are omitted. Furthermore, in the following, the recording medium 203a is described as a card (RFID card, NFC card) including a RFID tag or a NFC tag.

The mobile terminal device 20a of the user A reads information of the recording medium 203a at predetermined intervals, to share a file with the mobile terminal device 20b (step S126). That is to say, while the user A wants to share a file with the user B, the user A brings the recording medium 203a near a predetermined position of the mobile terminal device 20a (a position where the external I/F 203 can read the recording medium 203a). Then, the mobile terminal device 20a reads the information recorded in the recording medium 203a (step S127). When the reading of the recording medium 203a is successful, the mobile terminal device 20a sends a request to update the second validity period of the access key to the information storage device 10 (step S128).

The information storage device 10 updates the second validity period of the access key (step S129). That is to say, for example, the information storage device 10 makes the update by extending the second validity period of the access key (for example, extend by the same number of seconds as that of the predetermined interval described above).

The mobile terminal device 20b of the user B confirms whether the access key is present, with respect to the information storage device 10 at predetermined intervals, while the file acquired in step S124 is displayed (step S130). When the access key is present, the information storage device 10 makes a response including information indicating that the access key is valid, and the mobile terminal device 20b continues displaying the file (step S131).

At this time, for example, when the user A moves the recording medium 203a away from a predetermined position of the mobile terminal device 20a, even when the mobile terminal device 20a performs an operation of reading the recording medium 203a (step S132), the mobile terminal device 20a fails to read the recording medium 203a (step S133). When the mobile terminal device 20a fails to read the recording medium 203a, the mobile terminal device 20a sends a request to delete the access key to the information storage device 10 (step S134). Then, the information storage device 10 deletes the access key (step S135).

Note that when the mobile terminal device 20a fails to read the recording medium 203a, the request to update the second validity period of the access key is not made. Therefore, similar to the case described in the fourth embodiment, the information storage device 10 may delete the access key as the second validity period elapses.

In step S130 above, when the mobile terminal device 20b confirms whether the access key is present, and the access key has been deleted, the information storage device 10 makes a response including information indicating that the access key is invalid (does not exist) to the mobile terminal device 20b (step S136). Then, the mobile terminal device 20b ends the display of the file (step S137).

According to the above process, in the information storage system 1 according to the fifth embodiment, it is possible to implement control to display the file at the mobile terminal device 20b only while the mobile terminal device 20a can read the recording medium 203a (for example, only while the RFID card or the NFC card is brought near a predetermined position of the mobile terminal device 20a). Accordingly, it is possible to suppress the power consumed by continuously displaying a predetermined screen at the mobile terminal device 20 as in the fourth embodiment, and the period during which a file is displayed at the mobile terminal device 20b can be strictly controlled.

Sixth Embodiment

Next, a description is given of the information storage system 1 according to a sixth embodiment. In the information storage system 1 according to the sixth embodiment, the file is shared by the mobile terminal device 20b only while it is possible to read, at the mobile terminal device 20b, the same information as the information of the recording medium 203a read in advance with the mobile terminal device 20a (for example, identification information unique to the recording medium 203a).

Note that the information storage system 1 according to the sixth embodiment has a system configuration, a hardware configuration, and a software configuration that are the same as those of the information storage system 1 according to the first embodiment, and therefore descriptions of a system configuration, a hardware configuration, and a software configuration are omitted.

Details of Process

Figure 18:
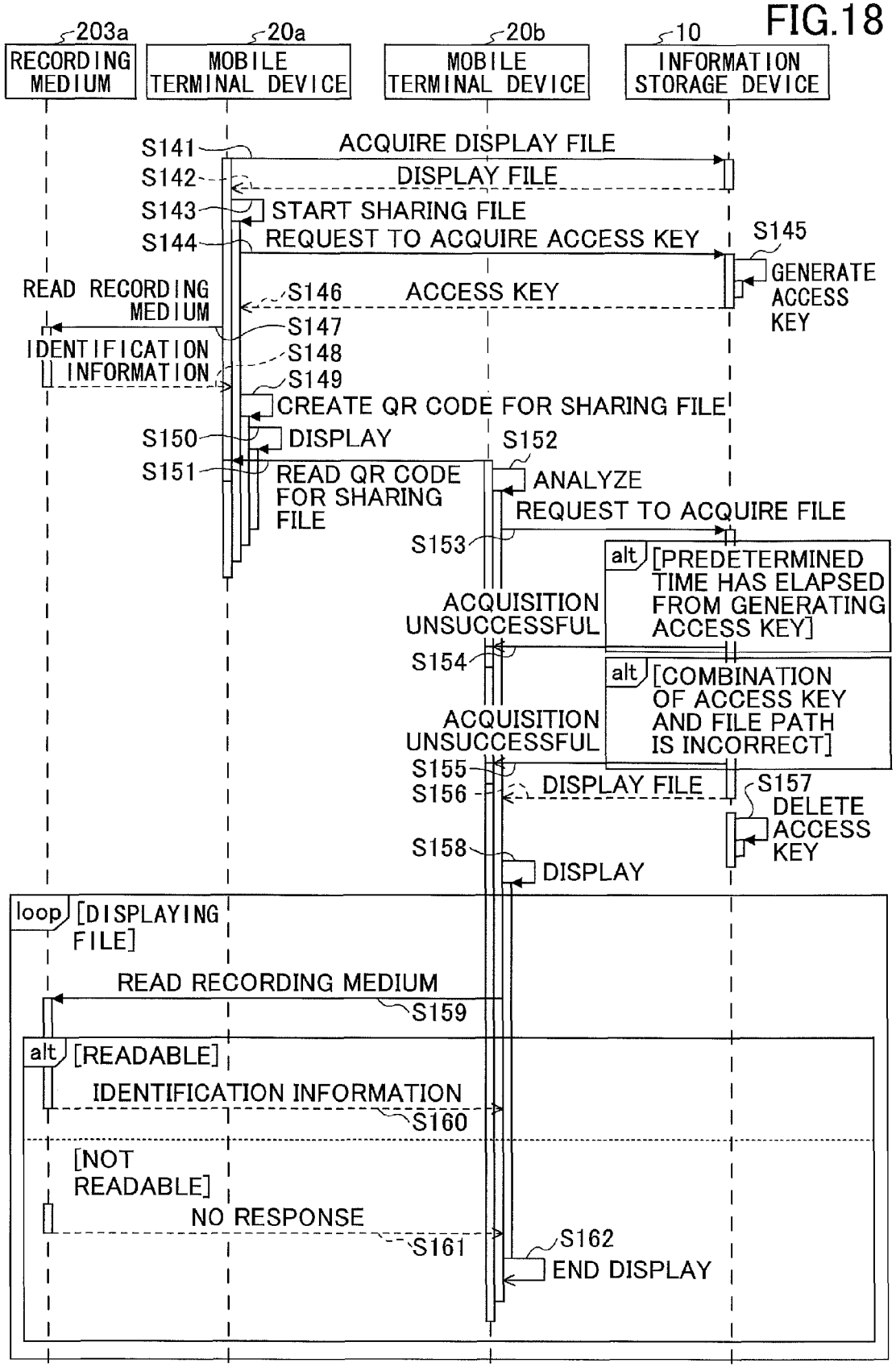
FIG. 18 is a sequence diagram of an example of processing procedures of the information storage system according to a sixth embodiment.

FIG. 18 is a sequence diagram of an example of processing procedures of the information storage system 1 according to the sixth embodiment. Note that the processes of steps S141 through S146 and steps S153 through S158 in the sequence diagram of FIG. 18 are the same as those of steps S11 through S16 and steps S21 through S26 in the sequence diagram of FIG. 7, and therefore descriptions thereof are omitted.

The mobile terminal device 20a of the user A reads the recording medium 203a (step S147), and acquires the information recorded in the recording medium 203a (for example, identification information unique to the recording medium 203a (card ID, etc.)) (step S148). In the present embodiment, the mobile terminal device 20a reads the recording medium 203a, and acquires the identification information unique to the recording medium 203a.

Next, the mobile terminal device 20a generates a QR code (code information) based on the access key and the identification information unique to the recording medium 203a (step S149), and displays the QR code on the display device 202 (step S150). Then, by reading this QR code with the camera device 209 (step S151), the mobile terminal device 20b can acquire, in addition to the access key and the file path, the unique identification information read from the recording medium 203a by the mobile terminal device 20a (step S152).

At this time, in order to start the sharing of the file (displaying of the file) at the mobile terminal device 20b of the user B, the recording medium 203a used in step S147 is brought near the predetermined position of the mobile terminal device 20b. The mobile terminal device 20b reads the information of the recording medium 203a at predetermined intervals while the file is displayed (step S159), and acquires the identification information unique to the recording medium 203a (step S160). Then, when the unique identification information acquired in step S152 and the unique identification information acquired in step S160 are the same, the mobile terminal device 20b continues to display the file. Meanwhile, when the unique identification information acquired in step S152 and the unique identification information acquired in step S160 are not the same, the mobile terminal device 20b ends the display of the file.

Meanwhile, when the mobile terminal device 20b fails to read the recording medium 203a in step S159 (step S161), the mobile terminal device 20b ends the display of the file (step S162).

According to the above process, in the information storage system 1 according to the sixth embodiment, the file can be shared at the mobile terminal device 20b, only while the same information as the information of the recording medium 203a read in advance by the mobile terminal device 20a, can be read by the mobile terminal device 20b. Accordingly, the communication load between the information storage device 10 and the mobile terminal device 20a and between the information storage device 10 and the mobile terminal device 20b is suppressed, and the period during which a file is displayed at the mobile terminal device 20b can be strictly controlled.

Seventh Embodiment

Next, a description is given of the information storage system 1 according to a seventh embodiment. In the information storage system 1 according to the seventh embodiment, when the mobile terminal device 20b displays (shares) a file and uses another device connected to the network N1, in addition to the second validity period, a validity period according to the usage of another device (validity period of another device) is included with respect to the access key. That is to say, in the information storage system 1 according to the seventh embodiment, a validity period is set for each device used by the mobile terminal device 20b.

In the following, a description is given of a case where the mobile terminal device 20b displays a file and makes a request to project the file to the projector 40. Therefore, the information storage device 10 of the information storage system 1 according to the present embodiment saves, in association with an access key in the storage area, a third validity period used for projecting the file by the projector 40, in addition to the second validity period used for displaying the file on the mobile terminal device 20b. In the information storage system 1 according to the present embodiment, by using the third validity period, the contents of the file are projected by the projector 40, only while the mobile terminal device 20a is displaying the predetermined screen. Note that, for example, when the mobile terminal device 20b displays the file stored in the information storage device 10 in a digital signage connected to the network N1, a fourth validity period used for this is saved in association with the access key in the storage area of the information storage device 10 in association with the access key.

Note that the information storage system 1 according to the seventh embodiment has a system configuration, a hardware configuration, and a software configuration that are the same as those of the information storage system 1 according to the first embodiment, and therefore descriptions of a system configuration, a hardware configuration, and a software configuration are omitted.

Details of Process

Figure 19:
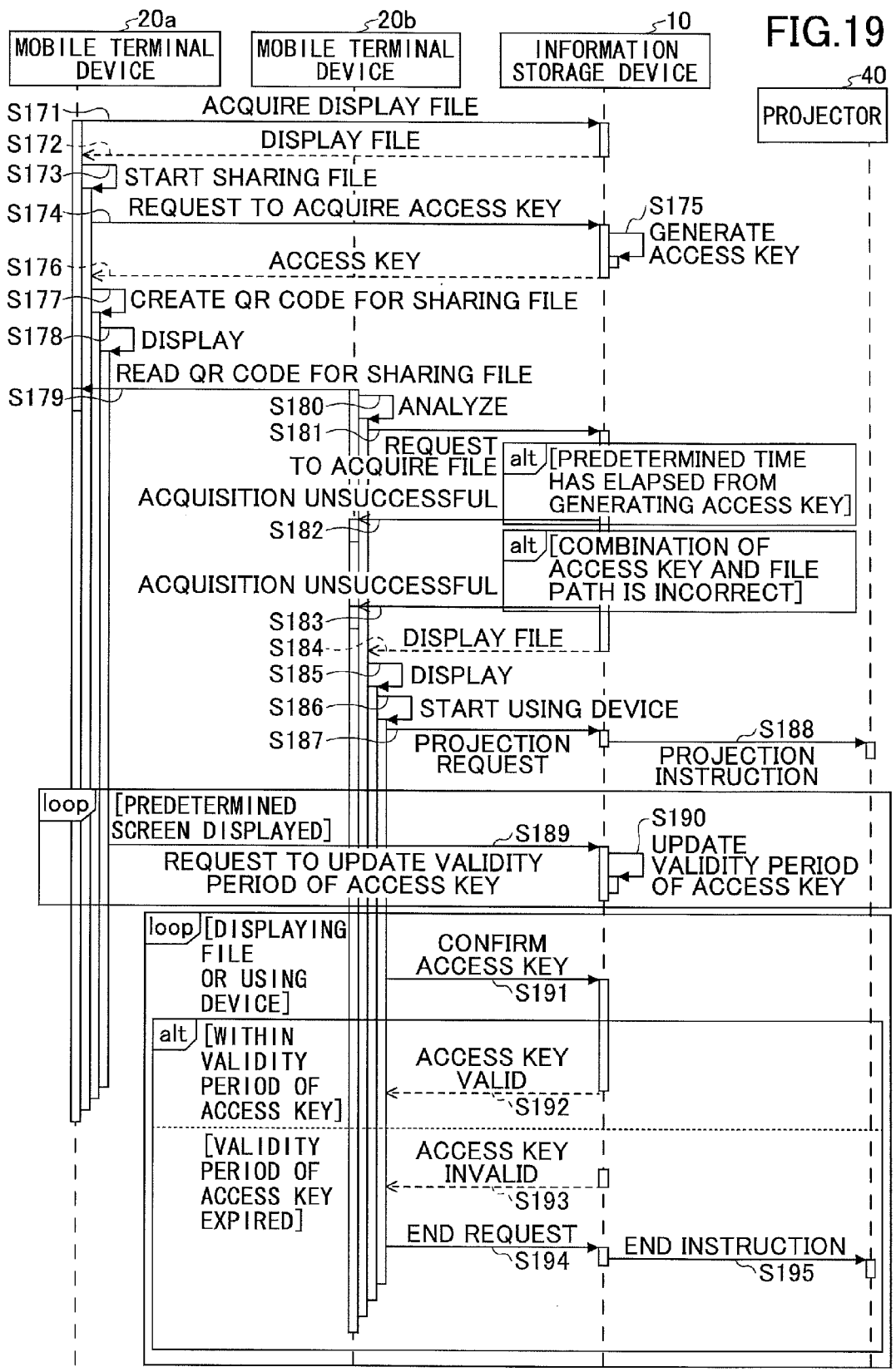
FIG. 19 is a sequence diagram of an example of processing procedures of the information storage system according to a seventh embodiment.

FIG. 19 is a sequence diagram of an example of processing procedures of the information storage system 1 according to the seventh embodiment. Note that the processes of steps S171 through S185 in the sequence diagram of FIG. 19 are the same as those of steps S81 through S95 in the sequence diagram of FIG. 16, and therefore descriptions thereof are omitted.

The user B uses the mobile terminal device 20b to perform an operation of starting to use a device (projector 40) (step S186). For example, this operation is for projecting a file displayed on the mobile terminal device 20b in step S185, by using the projector 40. Then, the mobile terminal device 20b sends a projection request including an access key and a file path, to the information storage device 10 (step S187), and the information storage device 10 sends a projection instruction including a file specified by the file path, to the projector 40 (step S188). Accordingly, the projector 40 projects the contents of the file included in the projection instruction.

The mobile terminal device 20a of the user A displays a predetermined screen. Then, the mobile terminal device 20a sends a request to update the second validity period and/or the third validity period of the access key at predetermined intervals to the information storage device 10, while this predetermined screen is displayed (step S189). A predetermined screen according to the present embodiment is, for example, any one of the following.

(1) A screen for allowing only to display (share) a file, to the mobile terminal device 20b.
(2) A screen for allowing only to project a file by using the projector 40, to the mobile terminal device 20b.
(3) A screen for allowing to display a file and to project a file by using the projector 40, to the mobile terminal device 20b.

Note that the above update request is a request to update the second validity period when the mobile terminal device 20a is displaying the screen described above in (1); the above update request is a request to update the third validity period when the mobile terminal device 20a is displaying the screen described above in (2); and the above update request is a request to update the second and third validity periods when the mobile terminal device 20a is displaying the screen described above in (3).

Next, the information storage device 10 updates the second validity period and/or the third validity period of the access key (step S190).

While the file acquired in step S184 is being displayed, or while the file is projected by using the projector 40, the mobile terminal device 20b of the user B confirms whether the second validity period and/or the third validity period of the access key has elapsed, with respect to the information storage device 10 at predetermined intervals (step S191). A description is given of a case where the mobile terminal device 20b confirms whether the third validity period of the access key has elapsed in the present embodiment. Note that the process of confirming whether the second validity period has elapsed is the same as that descripted with reference to steps S99 through S102 of FIG. 16 of the fourth embodiment.

When the third validity period of the access key has not elapsed, the information storage device 10 makes a response including information indicating that the access key is valid (step S192), and the mobile terminal device 20b continues the projection of the file by using the projector 40.

For example, when the mobile terminal device 20a of the user A ends the display of the screen described above in (3), and displays the screen described above in (1), the third validity period of the access key is not updated (meanwhile, the second validity period is updated). Therefore, when the third validity period has elapsed, the information storage device 10 makes a response including information indicating that the access key is invalid (step S193). Then, the mobile terminal device 20b sends a projection end request including the access key and the file path to the information storage device 10 (step S194), and the information storage device 10 sends an instruction to end the projection of the file to the projector 40 (step S195). Accordingly, the projector 40 ends the projection. Meanwhile, the sharing (displaying) of the file at the mobile terminal device 20b is continued.

According to the above process, in the information storage system 1 according to the seventh embodiment, the usage of another device by the mobile terminal device 20 can be further strictly controlled. That is to say, in the information storage system 1 according to the seventh embodiment, when the mobile terminal device 20b uses a plurality of functions such as displaying a file and using another device, the usage of each of the functions can be strictly controlled.

Note that in the present embodiment, the mobile terminal device 20b sends a projection request to the information storage device 10; however, the present embodiment is not so limited. For example, the mobile terminal device 20b may directly send a projection request to the projector 40. Furthermore, in the present embodiment, a projector is taken as an example; however, the present embodiment is not so limited. For example, various electronic devices may be used (device in which input or output of electronic data is possible, such as a MFP, an electronic blackboard, a monitor, and a camera).

Furthermore, in the present embodiment, the mobile terminal device 20b sends an end request to the information storage device 10; however, the present embodiment is not so limited. For example, the information storage device 10 may send an instruction indicating "prohibit acceptance of projection request" to the projector 40. By this configuration, even when the projector 40 receives a projection request from the mobile terminal device 20b, the projection can be prevented. In this case, the instruction indicating "prohibit acceptance of projection request" may include identification information of the target file and identification information of the mobile terminal device 20.

For example, by including the identification information of the file in the instruction, when a request to project the file is received from the mobile terminal device 20b, the projector 40 can determine whether the projection of the file included in the projection request is prohibited, by comparing the identification information of the file included in the instruction and the identification information of the file included in the received projection request. Furthermore, for example, by including the identification information of the mobile terminal device 20 in the instruction, the projector 40 can determine whether the received projection request is a projection request from a mobile terminal device 20 whose access key has become invalid. By this configuration, the information storage system 1 according to the present embodiment can appropriately determine whether the file can be projected.

Overview

According to the information storage system 1 according to the present embodiment, a file saved in the information storage device 10 can be shared by a plurality of mobile terminal devices 20.

Furthermore, the information storage device 10 issues an access key used for sharing a file, in response to a request from the mobile terminal device 20. Then, another mobile terminal device 20 can use this access key to acquire a file from the information storage device 10. Accordingly, even a mobile terminal device 20 of a user who does not have the right to access the file, can share the file.

Furthermore, the mobile terminal device 20 can issue an access key. Accordingly, the processing load of the information storage device 10 can be distributed.

Furthermore, the information storage device 10 can store the number of times of authenticating the access key. Accordingly, when the number of times of authentication reaches a predetermined value, the access key is deleted from the storage area, so that the access key is invalidated. Accordingly, for example, the file can be shared among a plurality of mobile terminal devices 20. Note that the number of times of authentication is an example of an access frequency indicating the possible frequency of accessing a predetermined storage area.

Furthermore, control can be implemented to display a file at the mobile terminal device 20b, while the mobile terminal device 20a is displaying a predetermined screen. Accordingly, the period of displaying a file at the mobile terminal device 20b can be further strictly controlled.

Furthermore, control can be implemented to display a file at the mobile terminal device 20b, only while the mobile terminal device 20a can read the recording medium 203a. Accordingly, it is possible to suppress the power consumed by continuously displaying a predetermined screen at the mobile terminal device 20a, and the period during which a file is displayed at the mobile terminal device 20b can be strictly controlled.

Furthermore, the file can be shared by the mobile terminal device 20b, only while the same information as the information of the recording medium 203a read in advance at the mobile terminal device 20a, is readable at the mobile terminal device 20b. Accordingly, the communication load between the information storage device 10 and the mobile terminal device 20a and between the information storage device 10 and the mobile terminal device 20b is suppressed, and the period during which a file is displayed at the mobile terminal device 20b can be strictly controlled.

Furthermore, the usage of another device by the mobile terminal device 20b can be further strictly controlled.

According to one embodiment of the present invention, with respect to a predetermined storage area to which access from information processing devices other than a predetermined information processing device is not allowed, the information processing devices other than a predetermined information processing device can access the predetermined storage area without being allowed in advance.

The information storage system and the information storage method are not limited to the specific embodiments described herein, and variations and modifications may be made without departing from the spirit and scope of the present invention.

The present application is based on and claims the benefit of priority of Japanese Priority Patent Application No. 2013-230547, filed on Nov. 6, 2013 and Japanese Priority Patent Application No. 2014-212729, filed on Oct. 17, 2014, the entire contents of which are hereby incorporated herein by reference.

What is claimed is:

1. An information storage system comprising:
    two or more information processing devices including a first information processing device and a second information processing device;
    an information storage device connected to the two or more information processing devices;
    an access information generating unit configured to generate, based on a request from the first information processing device, access information for accessing a predetermined storage area in the information storage device; wherein among said two or more information processing devices, access to the predetermined storage area is restricted from the information processing devices other than the first information processing device;
    a display unit configured to cause the first information processing device to display the access information;
    a sending unit configured to cause the second information processing device to acquire the access information displayed on the first information processing device and to send the access information that has been acquired to the information storage device; and
    an access unit configured to cause the information storage device to allow the second information processing device to access the predetermined storage area based on the access information sent from the second information processing device.

2. The information storage system according to claim 1, wherein
    the information storage device includes
        a saving unit configured to save the access information generated by the access information generating unit, and the access unit
- determines whether to allow the second information processing device to access the predetermined storage area based on the access information sent from the second information processing device and the access information saved in the saving unit, and
- deletes the access information saved in the saving unit when the access unit determines to allow the second information processing device to access the predetermined storage area.

3. The information storage system according to claim 2, wherein
- the saving unit saves, in association with each other, the access information and information relevant to a first validity period of the access information, and
- the access unit does not allow the second information processing device to access the predetermined storage area, when the first validity period has elapsed.

4. The information storage system according to claim 2, wherein
- the saving unit saves, in association with each other, the access information and information relevant to an access frequency indicating a number of times access to the predetermined storage area is possible by the access information, and
- the access unit does not allow the second information processing device to access the predetermined storage area, when the access frequency has been exceeded.

5. The information storage system according to claim 2, wherein
- the saving unit saves, in association with each other, the access information and identification information of a first recording medium of a non-contact type which the first information processing device has acquired from the first recording medium, and
- the access unit determines whether to allow the second information processing device to access the predetermined storage area, based on identification information of a second recording medium of a non-contact type which the second information processing device has acquired from the second recording medium, the access information, and the identification information of the first recording medium.

6. The information storage system according to claim 2, wherein
- the saving unit saves, in association with each other, the access information and information relevant to a second validity period of the access information, and
- the access unit does not allow the second information processing device to access the predetermined storage area, when the second validity period has elapsed.

7. The information storage system according to claim 6, wherein
- the information storage device includes one or more electronic devices,
- the saving unit saves, in association with each other, the access information and information relevant to a third validity period of the access information for each of the one or more electronic devices,
- the access unit does not allow access to the predetermined storage area for sending a predetermined file stored in the predetermined storage area to the second information processing device, when the second validity period has elapsed, and
- the access unit does not allow access to the predetermined storage area for sending a predetermined file stored in the predetermined storage area to the one or more electronic devices, when the third validity period has elapsed.

8. The information storage system according to claim 6, wherein
- the information storage device updates information relevant to the second validity period saved in the saving unit, in response to an update request to update the information relevant to the second validity period, the update request being periodically sent from the first information processing device.

9. The information storage system according to claim 8, wherein
- the update request is sent when the first information processing device reads a predetermined recording medium of a non-contact type.

10. The information storage system according to claim 9, wherein
- the predetermined recording medium is RFID (Radio Frequency Identifier) or NFC (Near Field Communication).

11. The information storage system according to claim 1, wherein
- the access information includes information relevant to a storage destination of a file stored in the predetermined storage area, and
- the access unit sends the file stored in the predetermined storage area, when the access unit allows the second information processing device to access the predetermined storage area based on the access information sent from the second information processing device and the information relevant to the storage destination of the file included in the access information.

12. The information storage system according to claim 1, wherein
- the display unit generates code information based on the access information and causes the first information processing device to display the code information, and
- the second information processing device acquires the access information from the code information displayed on the first information processing device.

13. The information storage system according to claim 12, wherein
- the code information is a QR code.

14. An information storage system comprising:
- an information processing device; and
- at least one other information processing device connected to the information processing device;
- an access information generating unit configured to generate, based on a request from the information processing device, access information for accessing a predetermined storage area to which access is restricted from the at least one other information processing device;
- a display unit configured to cause the information processing device to display the access information;
- a sending unit configured to cause the at least one other information processing device to acquire the access information displayed on the information processing device and send the access information that has been acquired; and
- an access unit configured to allow the at least one other information processing device to access the predetermined storage area based on the access information that has been sent.

15. An information storage method performed in an information storage system including two or more information processing devices including a first information processing device and a second information processing device, and an information storage device connected to the two or more information processing devices, the information storage method comprising:

generating, based on a request from the first information processing device, access information for accessing a predetermined storage area in the information storage device; wherein among said two or more information processing devices, access to the predetermined storage area is restricted from the information processing devices other than the first information processing device;

causing the first information processing device to display the access information;

causing the second information processing device to acquire the access information displayed on the first information processing device and send the access information that has been acquired; and allowing the second information processing device to access the predetermined storage area based on the access information sent from the second information processing device.

* * * * *